(12) United States Patent
Matsudo

(10) Patent No.: US 9,667,939 B2
(45) Date of Patent: May 30, 2017

(54) IMAGE PROCESSING APPARATUS, IMAGE PROCESSING METHOD, AND PROGRAM

(75) Inventor: Masaharu Matsudo, Chiba (JP)

(73) Assignee: Sony Corporation, Tokyo (JP)

( * ) Notice: Subject to any disclaimer, the term of this patent is extended or adjusted under 35 U.S.C. 154(b) by 719 days.

(21) Appl. No.: 13/482,471

(22) Filed: May 29, 2012

(65) Prior Publication Data

US 2012/0308203 A1    Dec. 6, 2012

(30) Foreign Application Priority Data

Jun. 6, 2011    (JP) .................................. 2011-126027

(51) Int. Cl.
*H04N 9/80*    (2006.01)
*H04N 13/00*    (2006.01)

(52) U.S. Cl.
CPC .............................. *H04N 13/0022* (2013.01)

(58) Field of Classification Search
None
See application file for complete search history.

(56) References Cited

U.S. PATENT DOCUMENTS 8,044,997 B2 * 10/2011 Masuda et al. ................ 348/51
2007/0296721 A1 * 12/2007 Chang et al. ................ 345/427
2010/0201790 A1 * 8/2010 Son et al. ................ 348/53
2010/0302365 A1 * 12/2010 Finocchio et al. ............ 348/142
2011/0109731 A1 * 5/2011 Koo et al. ................ 348/51
2012/0176473 A1 * 7/2012 Genova et al. ................ 348/46

FOREIGN PATENT DOCUMENTS

JP        2008-103820        5/2008

* cited by examiner

*Primary Examiner* — Heather Jones
(74) *Attorney, Agent, or Firm* — Paratus Law Group, PLLC

(57) ABSTRACT

A depth map generating unit generates depth information indicating the depth of a subject in each pixel of frames of a moving image. An additional information generating unit generates additional information regarding a change between continuous frames. A reading and writing unit writes a depth map and the additional information on the recording medium and reads the depth map and the additional information from the recording medium. A depth map correcting unit corrects the depth map read by the reading and writing unit based on the additional information read by the reading and writing unit. The reading and writing unit performs overwriting with the depth map corrected by the depth map correcting unit on the recording medium. The present technology is applicable to an image processing apparatus that generates depth information indicating a sense of depth of a stereoscopic image.

12 Claims, 19 Drawing Sheets

FIG. 16
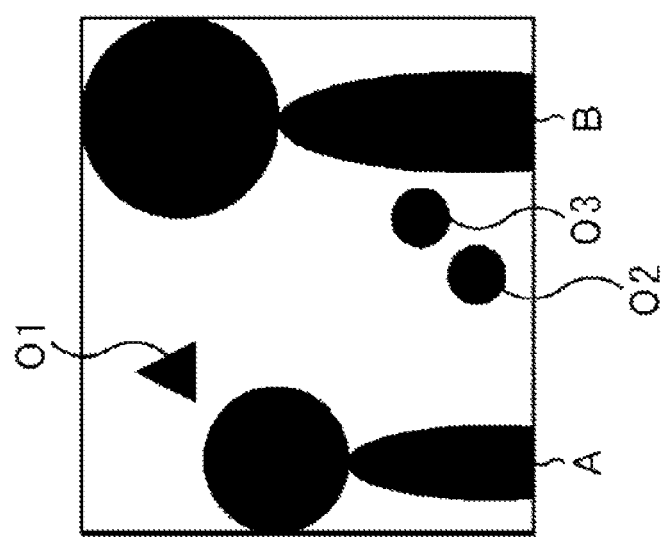
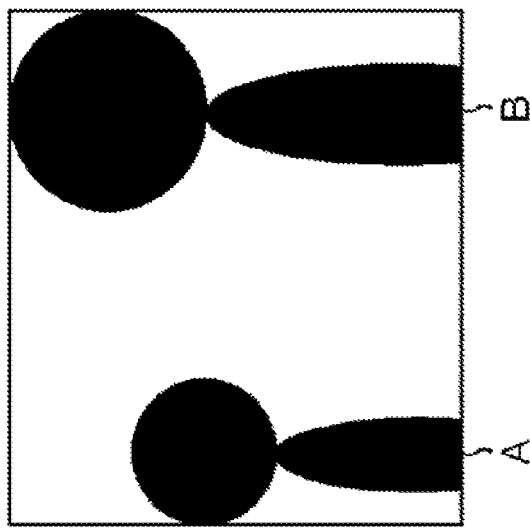

IMAGE PROCESSING APPARATUS, IMAGE PROCESSING METHOD, AND PROGRAM

BACKGROUND

The present technology relates to an image processing apparatus, an image processing method, and a program, and more particularly, to an image processing apparatus, an image processing method, and a program capable of improving a sense of depth of a stereoscopic image without processing delay and with a smaller circuit.

In the related art, technologies of generating parallax information of a moving image and reproducing a three-dimensional moving image based on the parallax information have been suggested.

Further, a stereoscopic image processing apparatus has been suggested which superimposes an image indicating a parallax distribution and a three-dimensional moving image when the three-dimensional moving image is reproduced (for example, see Japanese Unexamined Patent Application Publication No. 2008-103820).

SUMMARY

However, the generated parallax information is not corrected in the above-mentioned technology. Accordingly, when viewing a reproduced moving image, it is difficult to perceive depth any better than the sense of depth created by the generated parallax information.

When the parallax information is corrected, the correction process is performed based on parallax information regarding a plurality of frames of the moving image in real time, as the parallax information is generated.

In this case, however, processing delay occurs in the moving image to the extent of the correction of the parallax information, a frame memory retaining a plurality of frames is necessary, and therefore the size of the circuit may increase.

It is desirable to provide an image processing apparatus, an image processing method, and a program capable of improving a sense of depth of a stereoscopic image without processing delay and with a smaller circuit.

According to an embodiment of the present technology, there is provided an image processing apparatus including: a reading and writing unit that writes and reads depth information indicating a depth of a subject in frames of a moving image, and change information indicating a change between continuous frames, on and from a recording medium; and a depth information correcting unit that corrects the depth information read by the reading and writing unit based on the change information read by the reading and writing unit. The reading and writing unit performs overwriting with the depth information corrected by the depth information correcting unit on the recording medium.

The image processing apparatus may further include: a depth information generating unit that generates the depth information based on the moving image recorded on the recording medium; and a change information generating unit that generates the change information based on the moving image recorded on the recording medium. The reading and writing unit writes the depth information generated by the depth information generating unit and the change information generated by the change information generating unit on the recording medium.

The change information generating unit may generate the change information regarding a change between an interest frame and an adjacent frame adjacent to the interest frame. The depth information correcting unit may correct the depth information of the interest frame based on the change information read by the reading and writing unit.

The change information generating unit may generate pixel value change information indicating a change in a pixel value of a pixel between the interest frame and the adjacent frame, and depth information change information indicating a change in the depth information between the interest frame and the adjacent frame. When the change in the pixel value expressed by the pixel value change information is small and the change in the depth information expressed by the depth information change information is large, the depth information correcting unit may replace the depth information of the interest frame with the depth information of the adjacent frame.

The change information generating unit may generate composition change information indicating a change in a composition between the interest frame and the adjacent frame, and depth information change information indicating a change in the depth information between the interest frame and the adjacent frame. The depth information correcting unit may set a weighted average of the depth information of the interest frame and the depth information of the adjacent frame to the depth information of the interest frame, in accordance with the change in the composition expressed by the composition change information and the change in the depth information expressed by the depth information change information.

The change information generating unit may generate scene change information indicating a change in a scene between the interest frame and the adjacent frame. The depth information correcting unit may correct the depth information of the interest frame in accordance with the change in the scene expressed by the scene change information.

The change information generating unit may generate a motion vector as the change information based on the interest frame and the adjacent frame. The depth information correcting unit may perform motion compensation on the depth information of the interest frame based on the motion vector.

The image processing apparatus may further include the recording medium.

The recording medium may be mounted on the outside of the image processing apparatus.

The image processing apparatus may further include a change information updating unit that updates the change information corresponding to the depth information corrected by the depth information correcting unit. The reading and writing unit may perform overwriting with the change information updated by the change information updating unit on the recording medium.

According to another embodiment of the present technology, there is provided an image processing method of an image processing apparatus including a reading and writing unit that writes and reads depth information indicating a depth of a subject in frames of a moving image, and change information indicating a change between continuous frames, on and from a recording medium, and a depth information correcting unit that corrects the read depth information by the reading and writing unit based on the change information read by the reading and writing unit. The image processing method may include: by the image processing apparatus, reading the depth information indicating the depth of the subject in the frames of the moving image and the change information indicating the change between the continuous frames from a recording medium; correcting the read depth information based on the read change information; and performing overwriting with the corrected depth information on the recording medium.

According to still another embodiment of the present technology, there is provided a program for causing a computer to execute a process including: reading depth information indicating a depth of a subject in frames of a moving image, and change information indicating a change between the continuous frames, from a recording medium; correcting the depth information by the process of the reading step based on the change information read by the process of the reading step and performing overwriting with the depth information by the process of the correcting step on the recording medium.

According to the embodiments of the present technology, the depth information indicating the depth of the subject in the frames of the moving image, and the change information indicating the change between continuous frames, are read from the recording medium; the read depth information is corrected based on the read change information; and overwriting with the corrected depth information is performed on the recording medium.

According to the embodiments of the present technology described above, a sense of depth of a stereoscopic image can be improved without processing delay and with a smaller circuit.

BRIEF DESCRIPTION OF THE DRAWINGS

FIG. 16 is a diagram illustrating detection and selection of an object;

DETAILED DESCRIPTION OF THE EMBODIMENTS

Figure 1:
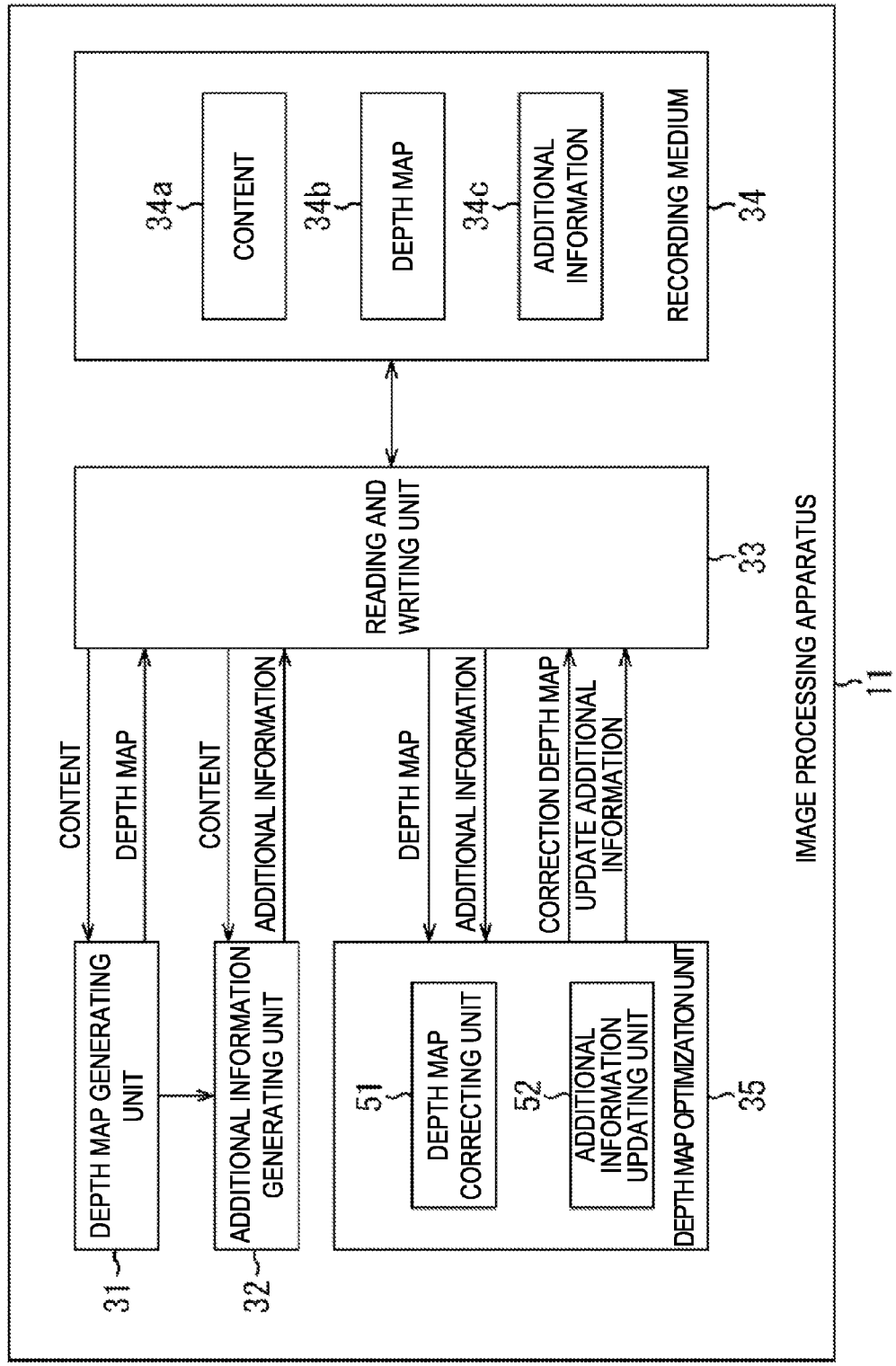
FIG. 1 is a block diagram illustrating an example of a functional configuration of an image processing apparatus according to an embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments of the present technology will be described with reference to the drawings. The description will be made in the following order:

1. Configuration of Image Processing Apparatus According to Embodiment of the Present Technology
2. Depth Map Generation and Optimization Processes
3. First Specific Example of Depth Map Optimization Process
4. Second Specific Example of Depth Map Optimization Process
5. Another Configuration of Image Processing Apparatus According to Embodiment of the Present Technology 1. Configuration of Image Processing Apparatus According to Embodiment of the Present Technology FIG. 1 is a diagram illustrating the configuration of an image processing apparatus according to an embodiment of the present technology.

An image processing apparatus 11 in FIG. 1 is configured as a hard disk drive (HDD) recorder or the like and records contents such as moving images.

The image processing apparatus 11 in FIG. 1 includes a depth map generating unit 31, an additional information generating unit 32, a reading and writing unit 33, a recording medium 34, and a depth map optimization unit 35.

The depth map generating unit 31 calculates a depth value as depth information indicating the depth of a subject in each pixel of a frame of content (moving image) read from the recording medium 34 by the reading and writing unit 33. Then, the depth map generating unit 31 generates a depth map with the depth value corresponding to one frame.

Figure 2:
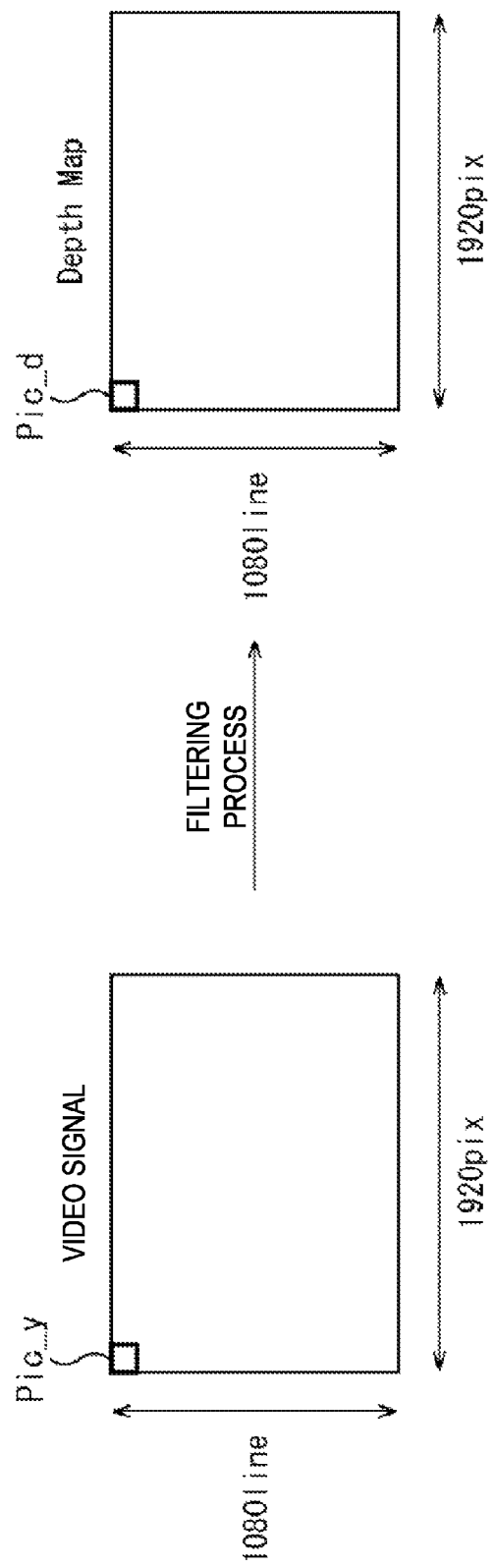
FIG. 2 is a diagram illustrating a depth map.

For example, as shown in FIG. 2, when a video signal corresponding to one frame of content with the resolution of 1920×1080 pixels (Full HD size) is read, the depth map generating unit 31 performs a predetermined filtering calculation process on a luminance value Pic_y of a pixel of the video signal to obtain a depth value Pic_d. The depth map generating unit 31 performs the predetermined filtering calculation process on all of the pixels of the video signal of one frame to generate a depth map. That is, the depth map can be said to be an image having the depth value as a pixel value.

Figure 3:
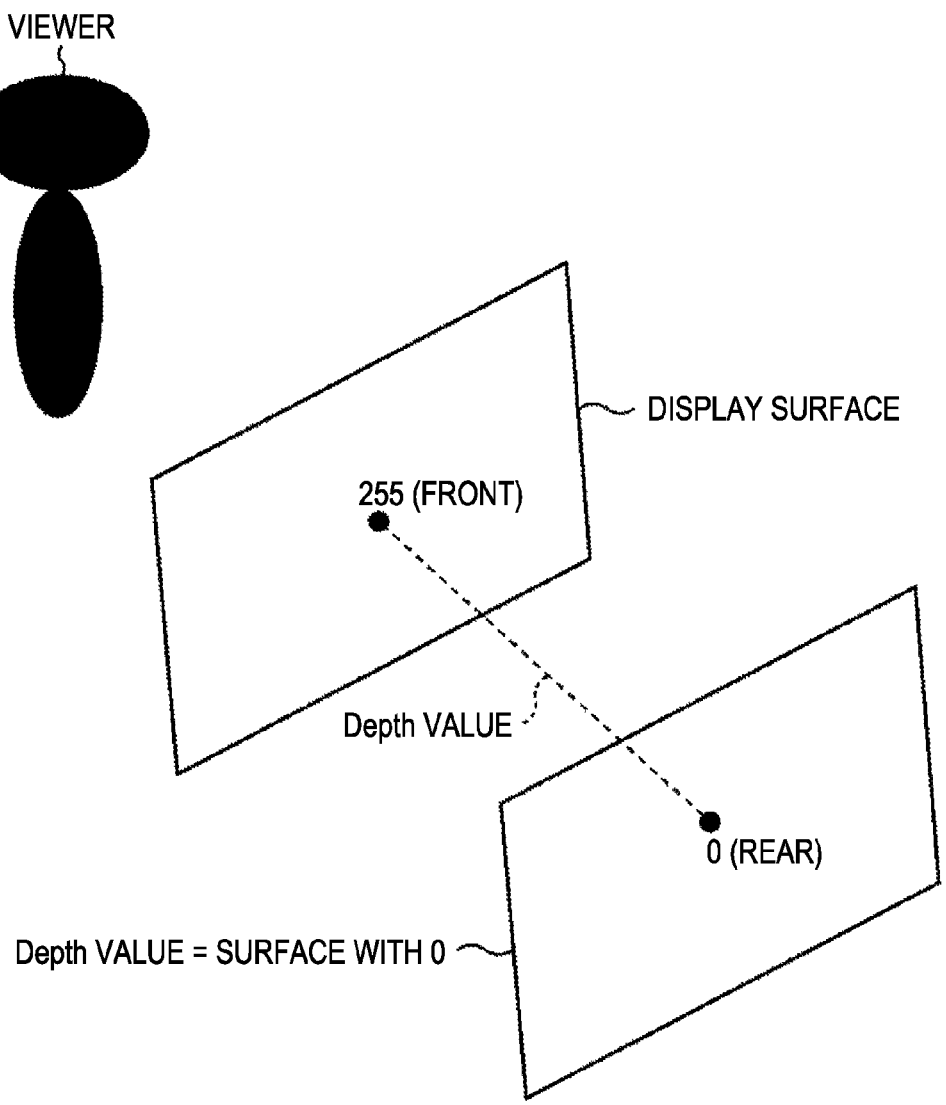
FIG. 3 is a diagram illustrating a depth value.

Here, as shown in FIG. 3, the depth value is a value that represents a sense of depth of a subject in content when viewed from a viewer. For example, when viewed from the viewer, a predetermined rear surface is set to a surface with a depth value of 0. When viewed from the viewer, the forefront display surface is set to a surface with the depth value of 255. The surfaces are expressed by eight bits from 0 to 255. Further, the depth value may relatively represent the depth of a subject or may be expressed by ten bits. When viewed from the viewer, the rear surface may be set to have the depth value of 255 and the front surface may be set to have the depth value of 0. The depth value is calculated based on the luminance value of a pixel, but may be calculated based on a color difference of a pixel.

The generated depth map is written on the recording medium 34 by the reading and writing unit 33.

The additional information generating unit 32 generates additional information as information regarding a change between continuous frames of content (moving image) read from the recording medium 34 by the reading and writing unit 33. The generated additional information is written on the recording medium 34 by the reading and writing unit 33.

The reading and writing unit 33 writes various kinds of data on the recording medium 34 and reads various kinds of data from the recording medium 34.

The recording medium 34, which is configured by an HDD, records content 34a, a depth map 34b, and additional information 34c. The content 34a is recorded in advance and is read suitably from the recording medium 34 by the reading and writing unit 33. Further, the depth map 34b and the additional information 34c are written suitably on the recording medium 34 or are read suitably from the recording medium 34 by the reading and writing unit 33.

The depth map optimization unit 35 performs an optimization process on the depth map and the additional information read from the recording medium 34 by the reading and writing unit 33.

The depth map optimization unit 35 includes a depth map correcting unit 51 and an additional information updating unit 52. The depth map correcting unit 51 corrects the depth map read from the recording medium 34 by the reading and writing unit 33 to generate a more suitable depth map. Overwriting with the corrected depth map (correction depth map) is performed on the recording medium 34 by the reading and writing unit 33. The additional information updating unit 52 updates the additional information read from the recording medium 34 by the reading and writing unit 33 in accordance with the correction performed on the depth map by the depth map optimization unit 51. Overwriting with the updated additional information (update additional information) is performed on the recording medium 34 by the reading and writing unit 33.

2. Depth Map Generation and Optimization Processes

Next, depth map generation and optimization processes of the image processing apparatus 11 will be described.

Depth Map Generation Process

Figure 4:
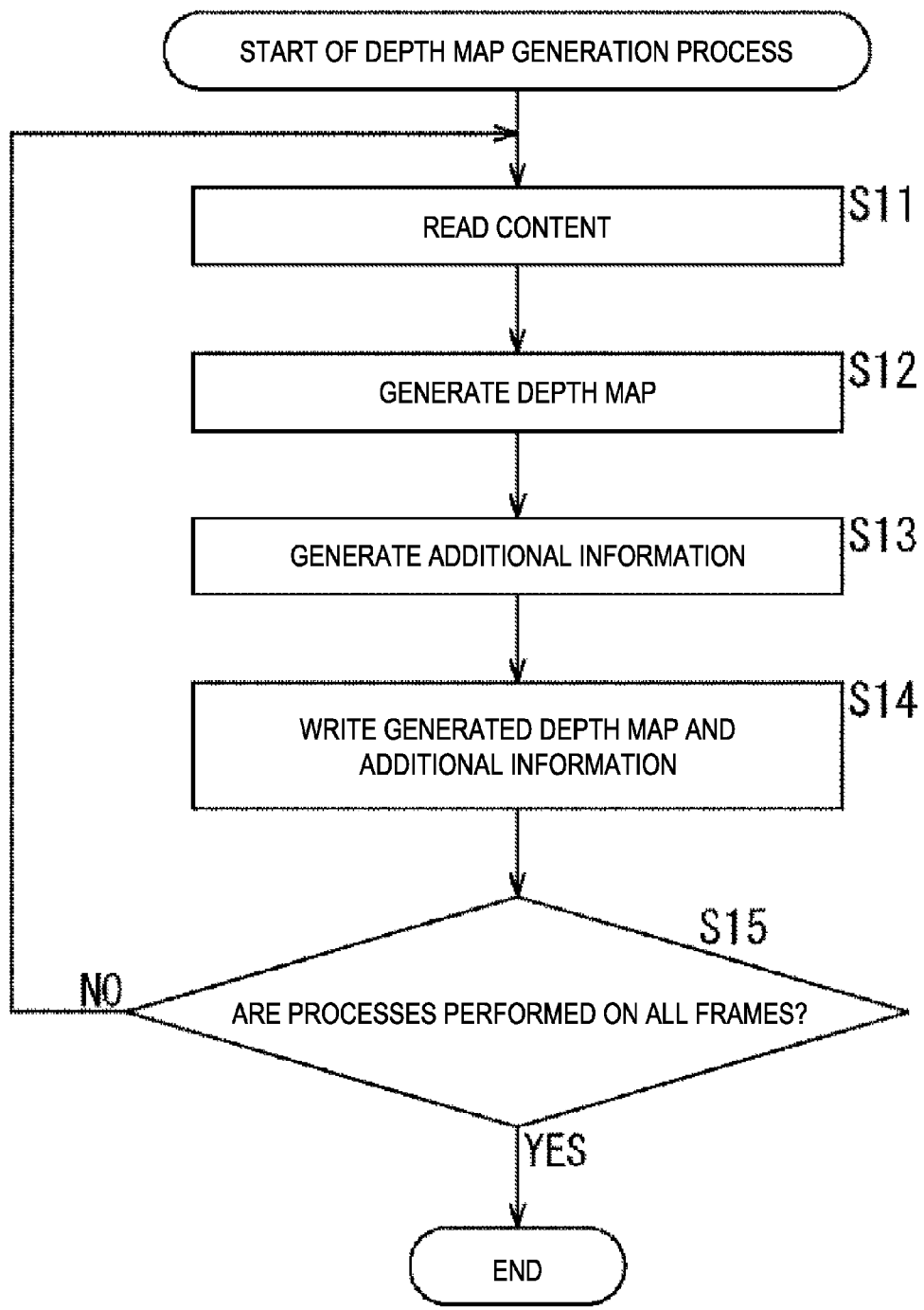
FIG. 4 is a flowchart illustrating a depth map generation process.

First, the depth map generation process of the image processing apparatus 11 will be described with reference to the flowchart of FIG. 4.

In step S11 the reading and writing unit 33 reads an interest frame that is of interest with regard to content such as a moving image, recorded on the recording medium 34, and adjacent frames adjacent to the interest frame, and then supplies the interest frame and the adjacent frames to the depth map generating unit 31 and the additional information generating unit 32.

In step S12, the depth map generating unit 31 generates the depth map of the interest frame of the content read from the recording medium 34 by the reading and writing unit 33, and then supplies the generated depth map to the reading and writing unit 33.

In step S13, the additional information generating unit 32 generates additional information regarding a change between the interest frame and the adjacent frames in the content read from the recording medium 34 by the reading and writing unit 33, and then supplies the generated additional information to the reading and writing unit 33.

Here, for example, pixel value change information indicating a change in the pixel value (for example, a luminance value) of a pixel between frames, depth map change information indicating a change in the depth map between the frames, composition change information indicating a change in a composition between frames, scene change information indicating a change (scene change) in a scene between frames, or a motion vector indicating a motion between frames is generated as the additional information.

In step S14, the reading and writing unit 33 writes the depth map from the depth map generating unit 31 and the additional information from the additional information generating unit 32, as the depth map and the additional information of the interest frame, respectively, on the recording medium 34.

In step S15, the reading and writing unit 33 determines whether the above-described processes are performed on all of the frames of the content 34a recorded on the recording medium 34.

When the reading and writing unit 33 determines that the processes are not performed on all of the frames in step S15, the process returns to step S11 and the processes from step S11 to step S15 are repeated.

On the other hand, when the reading and writing unit 33 determines that the processes are performed on all of the frames in step S15, the depth map generation process ends.

Thus, the depth map and the additional information are generated and recorded on the recording medium 34 which records the content.

Depth Map Optimization Process

Figure 5:
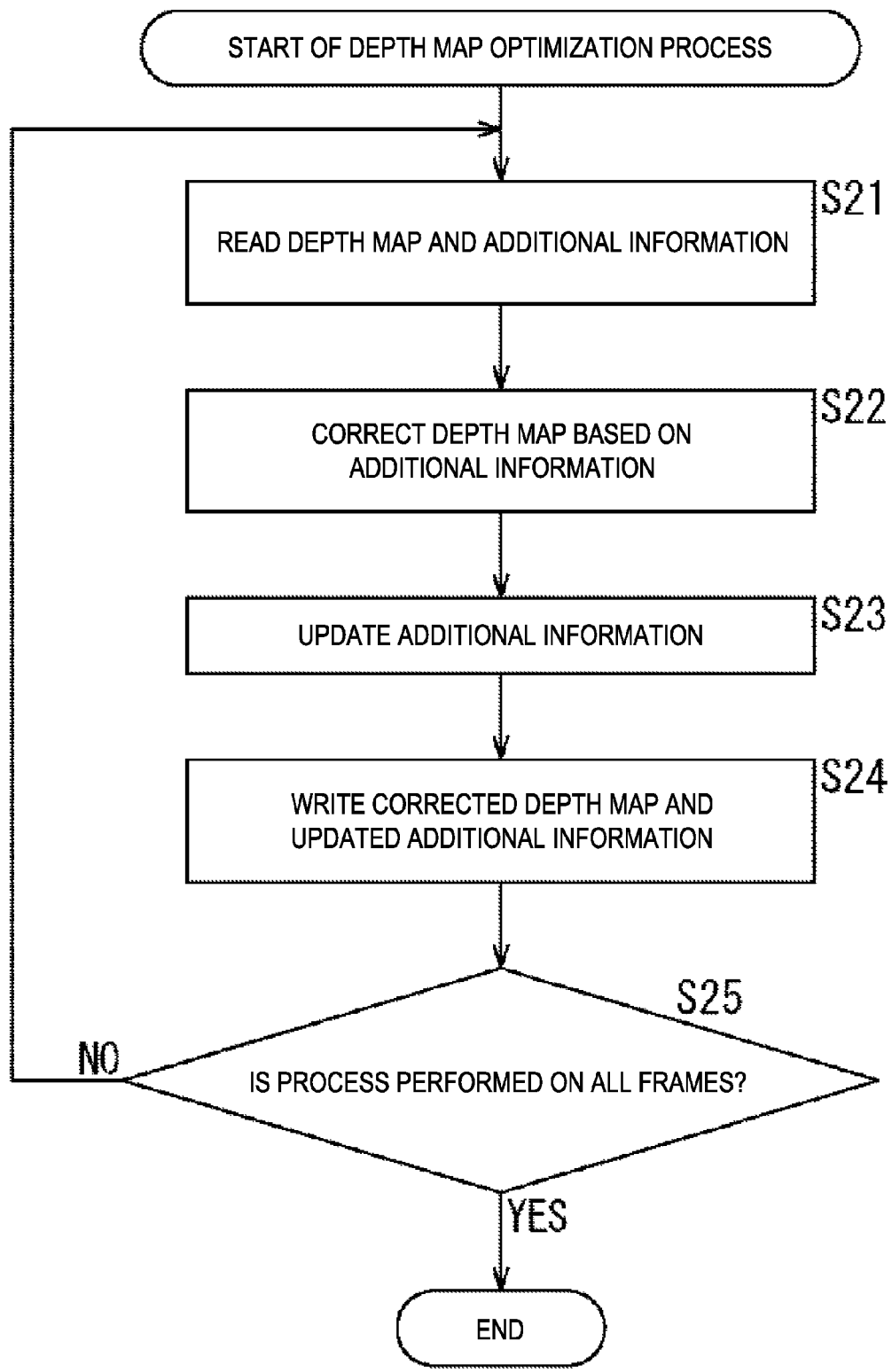
FIG. 5 is a flowchart illustrating a depth map optimization process.

Next, the depth map optimization process of the image processing apparatus 11 will be described with reference to the flowchart of FIG. 5.

In step S21, the reading and writing unit 33 reads the depth map and the additional information of the interest frame from the recording medium 34, and then supplies the depth map and the additional information of the interest frame to the depth map optimization unit 35.

In step S22, the depth map correcting unit 51 corrects the depth map based on the additional information read from the recording medium 34 by the reading and writing unit 33.

Here, when the additional information includes the pixel value change information and the depth map change information, the depth map correcting unit 51 corrects the depth map to generate a more suitable depth map in accordance with a change in the pixel value, which is expressed by the pixel value change information, between the frames, and a change in the depth map, which is expressed by the depth map change information, between the frames.

When the additional information includes the composition change information and the depth map change information, the depth map correcting unit 51 corrects the depth map to generate a more suitable depth map in accordance with a change in the composition, which is expressed by the composition change information, between the frames, and a change in the depth map, which is expressed by the depth map change information, between the frames.

When the additional information includes the scene change information, the depth map correcting unit 51 corrects the depth map to generate a more suitable depth map in accordance with a change in a scene, which is expressed by the scene change information, between the frames.

When the additional information includes the motion vector, the depth map correcting unit 51 performs a motion compensation process on the depth map to generate a more suitable depth map in accordance with the motion vector.

The corrected depth map is supplied to the reading and writing unit 33.

In step S23, the additional information updating unit 52 updates the additional information read from the recording medium 34 by the reading and writing unit 33 in accordance with the depth map corrected by the depth map correcting unit 51. The updated additional information is supplied to the reading and writing unit 33.

In step S24, the reading and writing unit 33 performs overwriting with the corrected depth map (correction depth map) from the depth map generating unit 31 and the updated additional information (update additional information) from the additional information generating unit 32, as the depth map and the additional information of the interest frame, respectively, on the recording medium 34.

In step S25, the reading and writing unit 33 determines whether the above-described processes are performed on the depth map and the additional information of all of the frames of the content 34a recorded on the recording medium 34.

When the reading and writing unit 33 determines that the above-described processes are not performed on all of the frames in step S25, the process returns to step S21 and the processes of step S21 to step S25 are repeated.

When the reading and writing unit 33 determines that the above-described processes are performed on all of the frames in step S25, the depth map optimization process ends.

The depth map generated in advance is corrected through the above-described processes so as to be more suitable based on the additional information generated in advance. Accordingly, a sense of depth that is enhanced compared to the sense of depth obtained using the initially generated depth map can be obtained in the stereoscopic image generated based on the depth map. Further, since the depth map is recorded on the recording medium that records the content, the correction of the depth map is not performed in real time as the depth map is generated, but rather the depth map is read from the recording medium to correct the depth map. Further, a frame memory retaining the frames of the content is not necessary. Thus, the sense of depth of a stereoscopic image can be improved without processing delay and with a smaller circuit.

The depth map is further optimized by repeating the above-described depth map optimization process.

When a depth map of each frame is generated according to the related art, an erroneous depth map is generated due to an influence of noise or the like in some cases. In this case, in the related art, time smoothing is performed using an infinite impulse response (IIR) filter or the like to correct the erroneous depth map.

Figure 6:
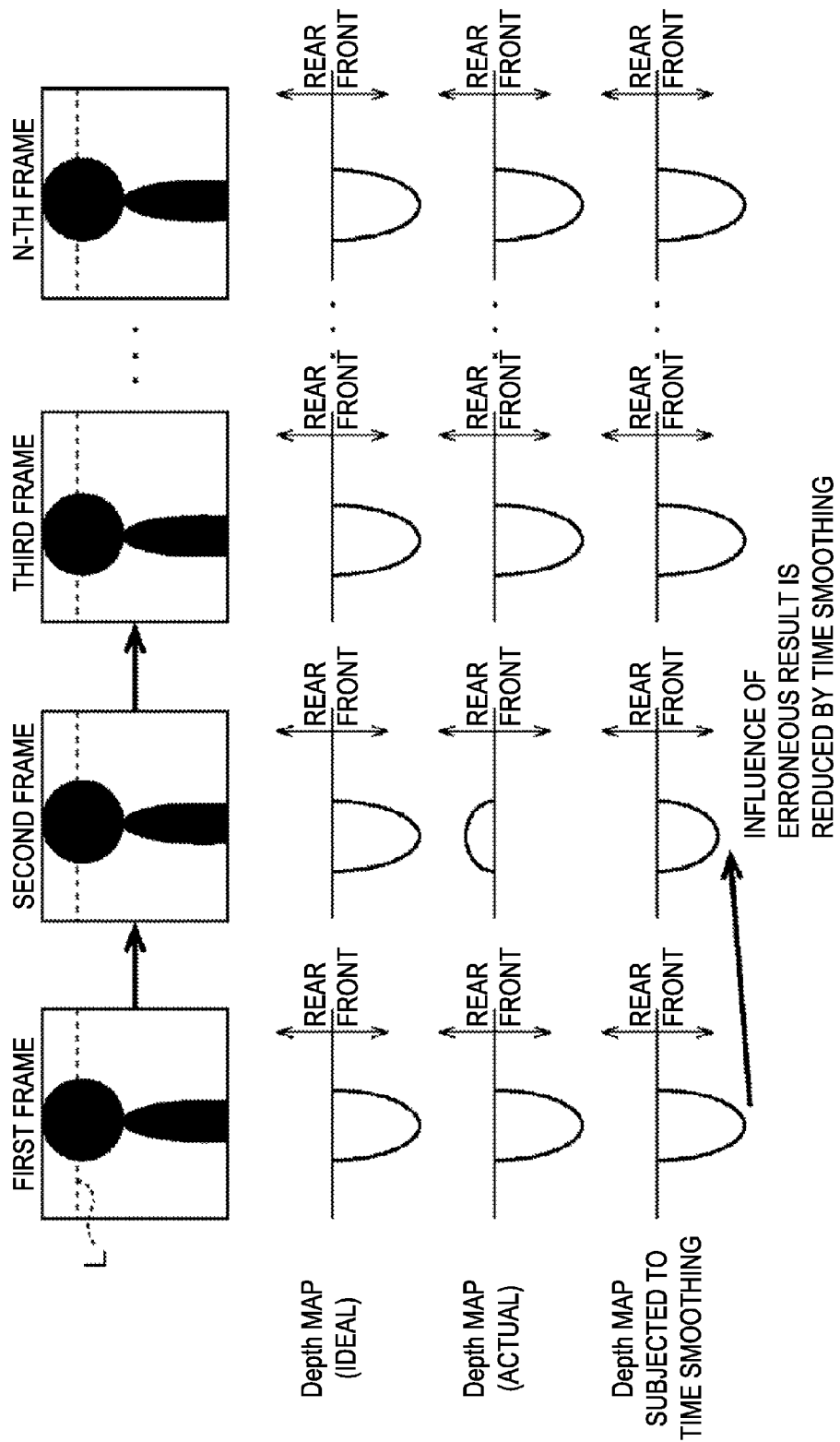
FIG. 6 is a diagram illustrating an example of time smoothing on the depth map.

FIG. 6 is a diagram illustrating an example of time smoothing on the depth map.

In FIG. 6, the first to N-th frames of the moving image are shown in the uppermost part and ideal depth maps of each frame in line L are shown in the second part from the upper side. However, as for the actual depth maps, an error may occur in the depth map of the second frame due to the influence of noise or the like, as shown in the third part from the upper side of FIG. 6. Accordingly, the error of the depth map of the second frame can be corrected by performing time smoothing on the depth map, as shown in the lowermost part of FIG. 6.

However, when time smoothing is performed on the depth map, a delay corresponding to the processing time of time smoothing may occur, and thus temporal deviation may occur between an image input in real time and the depth map.

Figure 7:
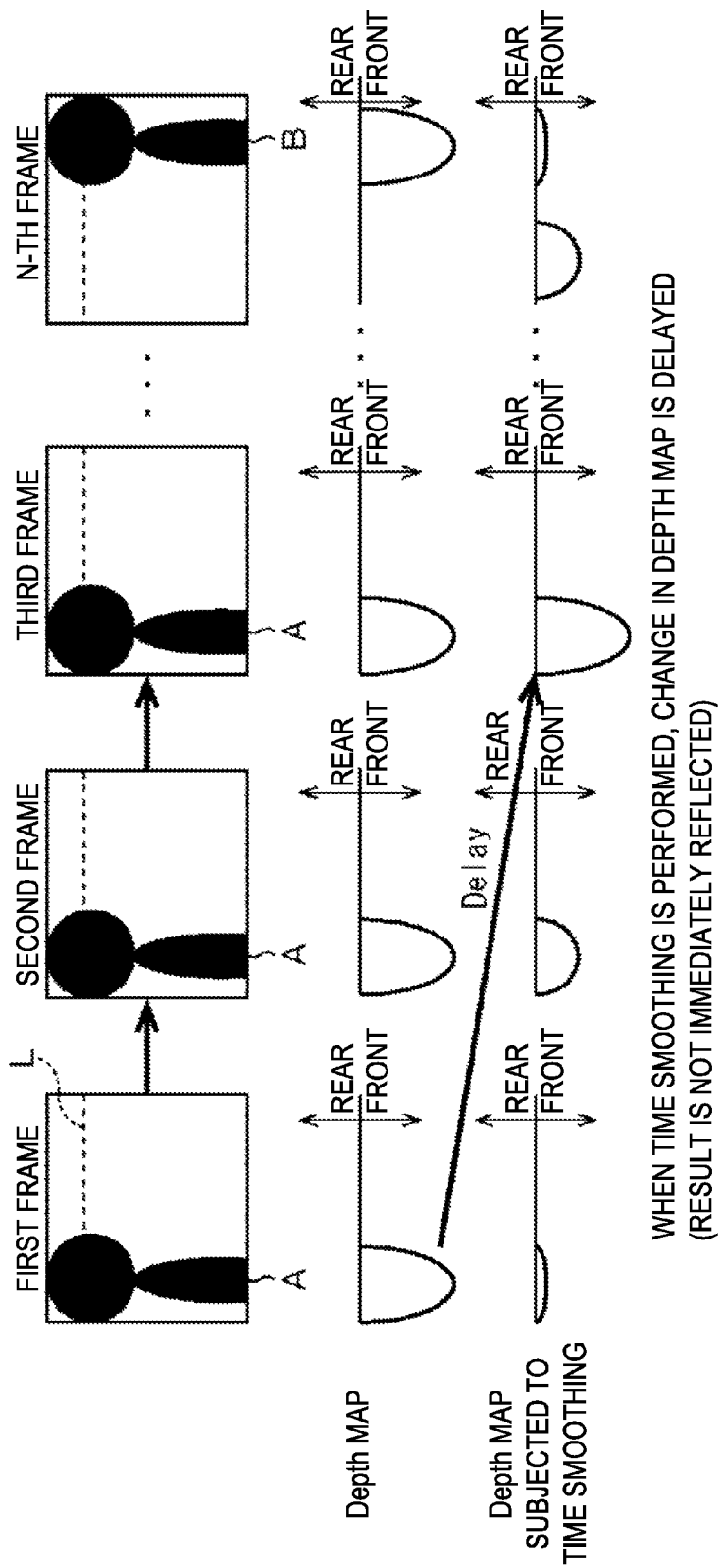
FIG. 7 is a diagram illustrating another example of time smoothing on the depth map.

FIG. 7 is a diagram illustrating another example of time smoothing on the depth map.

In FIG. 7, the first frame to the N-th frame of the moving image are shown in the uppermost part and the depth maps of the frames in line L are shown in the second part from the upper side. In the lowermost part of FIG. 7, the depth maps subjected to time smoothing are shown.

When time smoothing is performed, as shown in FIG. 7, delay occurs in the depth map. Therefore, the result of time smoothing is not immediately reflected and a change in the depth map is delayed. In particular, in the example of FIG. 7, a scene is changed in the N-th frame, and thus a subject is changed from person A on the left side of the frame to person B on the right side of the frame. However, the depth map subjected to time smoothing may not be followed even when the scene is replaced.

Figure 8:
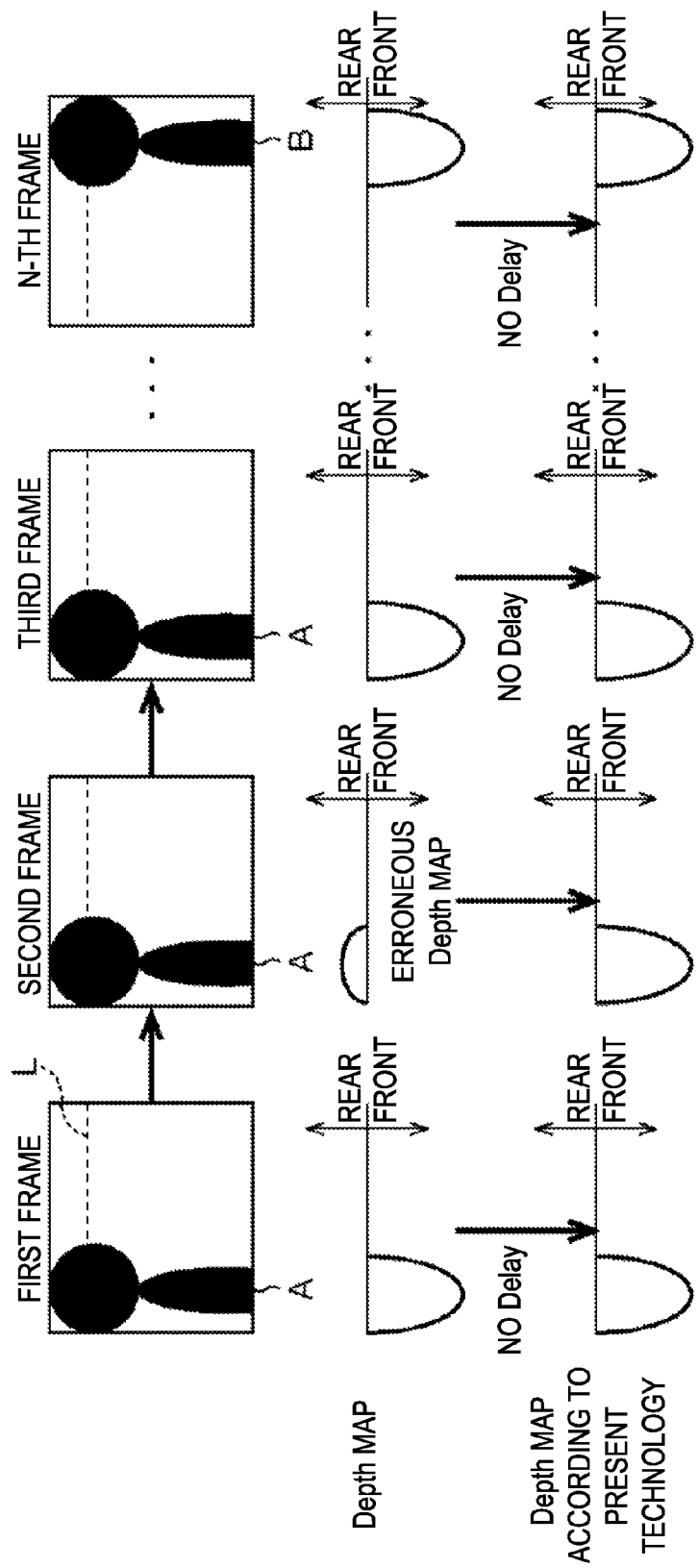
FIG. 8 is a diagram illustrating an example of a depth map according to an embodiment of the present technology.

On the other hand, according to the embodiment of the present technology, the content and the depth maps are recorded on the recording medium. Therefore, the change in the frame and the change in the depth map are known across the entire content. Accordingly, for example, even when an erroneous depth map is generated in the second frame, as shown in FIG. 8, a depth map suitably corrected based on the depth maps of the immediately previous and subsequent frames (first and third frames) can be used without use of the erroneous depth map. In addition, the temporal deviation (delay) can be made not to occur.

3. First Specific Example of Depth Map Optimization Process

Hereinafter, a specific configuration and a specific process of obtaining a stable depth map without temporal deviation, as described above, will be described. In the specific example, it is assumed that information indicating a change in the luminance value of a pixel between frames and information indicating a change in a depth map between frames are generated as the additional information.

Example of Specific Configuration of Additional Information Generating Unit

First, an example of the specific configuration of the additional information generating unit will be described with reference to FIG. 9.

Figure 9:
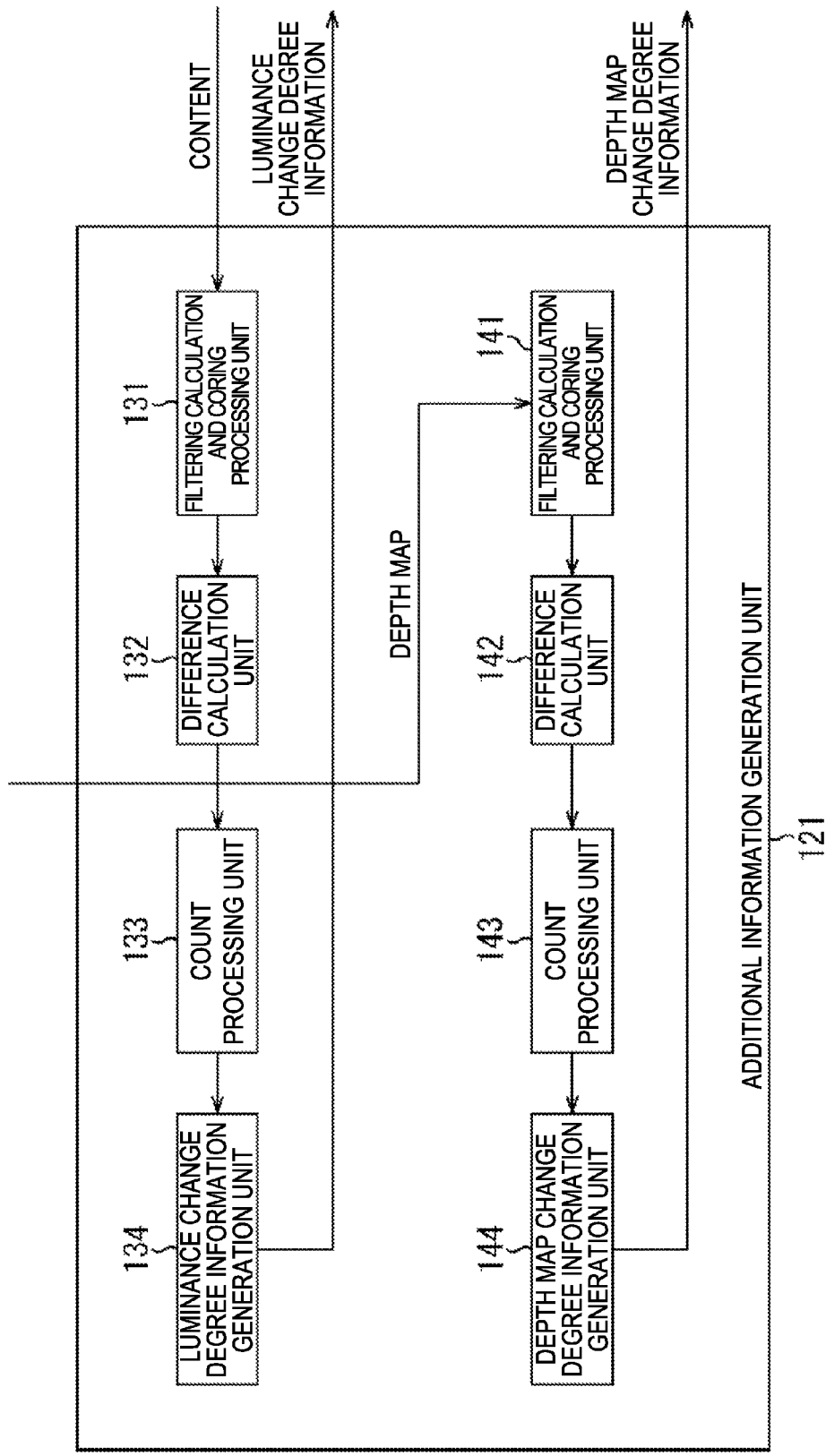
FIG. 9 is a block diagram illustrating an example of the specific configuration of an additional information generating unit.

An additional information generating unit 121 in FIG. 9 includes a filtering calculation and coring processing unit 131, a difference calculation unit 132, a count processing unit 133, a luminance change degree information generating unit 134, a filtering calculation and coring processing unit 141, a difference calculation unit 142, a count processing unit 143, and a depth map change degree information generating unit 144.

The filtering calculation and coring processing unit 131 performs predetermined filtering calculation or coring processing on the luminance values of the pixels of continuous frames of content read from the recording medium 34 by the reading and writing unit 33 in order to extract a specific component or remove noise, and then supplies the result to the difference calculation unit 132.

The difference calculation unit 132 calculates differences (frame differences) between the luminance values of the pixels of the continuous frames from the filtering calculation and coring processing unit 131, and then supplies the frame difference to the count processing unit 133.

The count processing unit 133 counts the number of frame difference values greater than a predetermined threshold value among the frame difference values of the pixels from the difference calculation unit 132, and then supplies the counted number to the luminance change degree information generating unit 134.

The luminance change degree information generating unit 134 generates luminance change degree information Yc indicating the degree of change in the luminance value between the continuous frames in accordance with the counted number from the count processing unit 133. Specifically, when the luminance values between the continuous frames change considerably, the luminance change degree information generating unit 134 generates luminance change degree information indicating "Yc=2." When the luminance values between the continuous frames change slightly, the luminance change degree information generating unit 134 generates luminance change degree information indicating "Yc=1." When the luminance values between the continuous frames change insignificantly, the luminance change degree information generating unit 134 generates luminance change degree information indicating "Yc=0." The generated luminance change degree information is written as part of the additional information on the recording medium 34 by the reading and writing unit 33.

The filtering calculation and coring processing unit 141 acquires the depth maps regarding the continuous frames from the depth map generating unit 31, performs the predetermined filtering calculation or the coring processing on the depth values of the depth maps in order to extract the specific component or remove noise, and then supplies the result to the difference calculation unit 142.

The difference calculation unit 142 calculates the differences (frame differences) between the depth values of the pixels of the continuous depth maps from the filtering calculation and coring processing unit 141, and supplies the frame differences to the count processing unit 143.

The count processing unit 143 counts the number of frame difference values greater than a predetermined threshold value among the frame difference values of the pixels from the difference calculation unit 142, and then supplies the counted number to the luminance change degree information generating unit 144.

The depth map change degree information generating unit 144 generates depth map change degree information Dc indicating the degree of change in the depth map between the continuous frames in accordance with the counted value from the count processing unit 143. Specifically, when the depth maps between the continuous frames change considerably, the depth map change degree information generating unit 144 generates depth map change degree information indicating "Dc=2." When the depth maps between the continuous frames change slightly, the depth map change degree information generating unit 144 generates depth map change degree information indicating "Dc=1." When the depth maps between the continuous frames change insignificantly, the depth map change degree information generating unit 144 generates depth map change degree information indicating "Dc=0." The generated depth map change degree information is written as part of the additional information on the recording medium 34 by the reading and writing unit 33.

Process of Generating Luminance Change Degree Information

Figure 10:
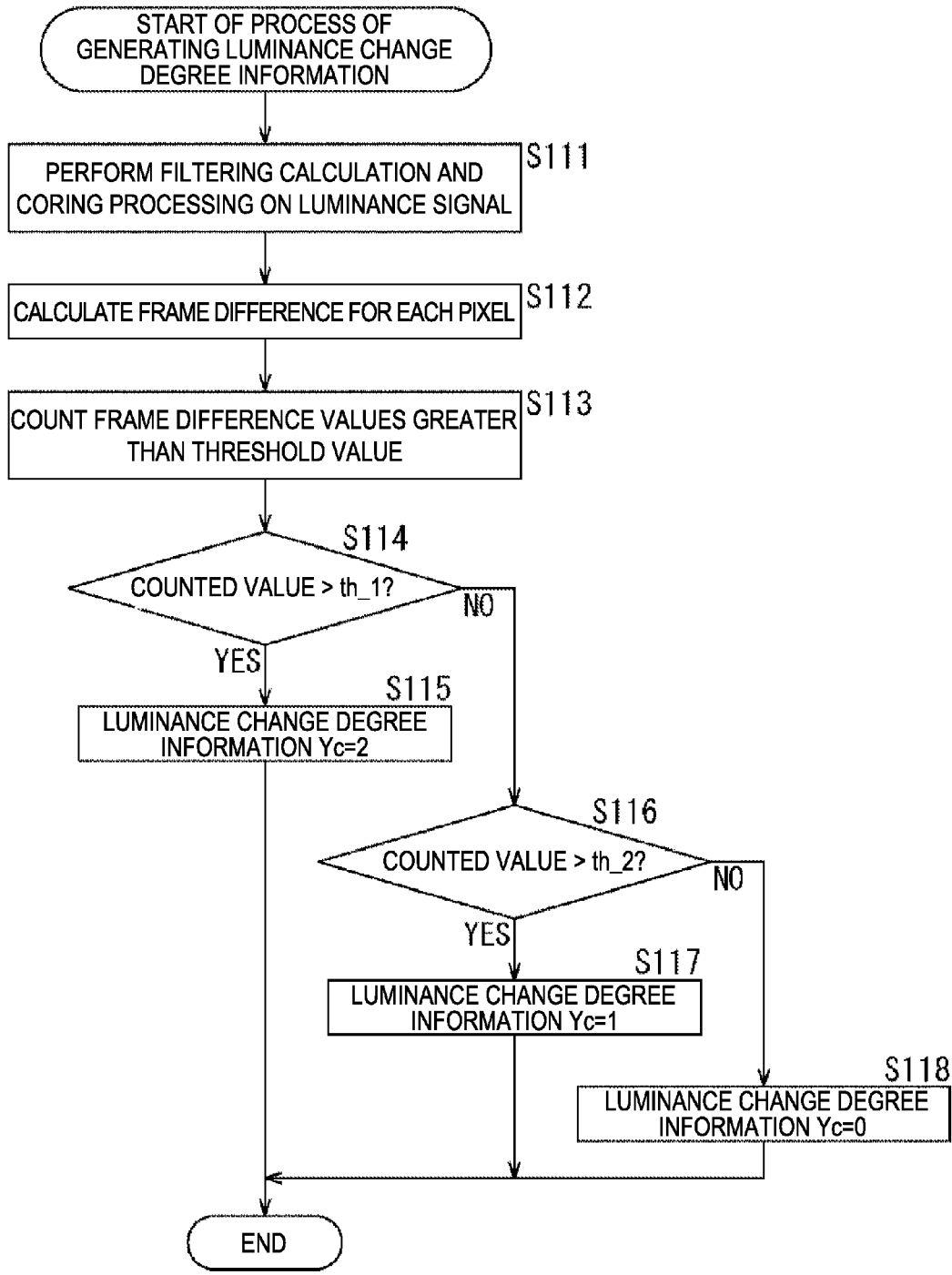
FIG. 10 is a flowchart illustrating a process of generating luminance change degree information.

Next, the process of generating the luminance change degree information by the additional information generating unit 121 will be described with reference to the flowchart of FIG. 10. The process of generating the luminance change degree information shown in FIG. 10 is performed on two continuous frames of the content read from the recording medium 34. Specifically, this process is performed on an interest frame and the frame temporally preceding the interest frame among the frames of the content read from the recording medium 34.

In step S111, the filtering calculation and coring processing unit 131 performs the predetermined filtering calculation or the coring processing on the luminance signal (luminance value) of each of the interest frame and the preceding frame, and then supplies the result to the difference calculation unit 132.

In step S112, the difference calculation unit 132 calculates the differences (frame differences) between the luminance values of the pixels of the interest frame and the preceding frame from the filtering calculation and coring processing unit 131, and then supplies the frame differences to the count processing unit 133.

In step S113, the count processing unit 133 counts the number of frame difference values larger than the predetermined threshold value among the frame difference values of the pixels from the difference calculation unit 132, and then supplies the counted number to the luminance change degree information generating unit 134.

In step S114, the luminance change degree information generating unit 134 determines whether the counted value from the count processing unit 133 is greater than a first threshold value th_1.

When the luminance change degree information generating unit 134 determines that the counted value from the count processing unit 133 is greater than the first threshold value th_1 in step S114, the process proceeds to step S115 and the luminance change degree information generating unit 134 sets the luminance change degree information "Yc=2."

On the other hand, when the luminance change degree information generating unit 134 determines that the counted value from the count processing unit 133 is not greater than the first threshold value th_1 in step S114, the process proceeds to step S116. Then, the luminance change degree information generating unit 134 determines whether the counted value from the count processing unit 133 is greater than a second threshold value th_2, which is smaller than the first threshold value th_1.

When the luminance change degree information generating unit 134 determines that the counted value from the count processing unit 133 is greater than the second threshold value th_2 in step S116, the process proceeds to step S117 and the luminance change degree information generating unit 134 sets the luminance change degree information "Yc=1."

On the other hand, when the luminance change degree information generating unit 134 determines that the counted value from the count processing unit 133 is not greater than the second threshold value th_2 in step S116, the process proceeds to step S118 and the luminance change degree information generating unit 134 sets the luminance change degree information "Yc=0."

When the above-described process is performed on each frame of the content recorded on the recording medium 34 as the interest frame, the luminance change degree information of each frame of the content recorded on the recording medium 34 is written as part of the additional information on the recording medium 34 by the reading and writing unit 33.

Process of Generating Depth Map Change Degree Information

Figure 11:
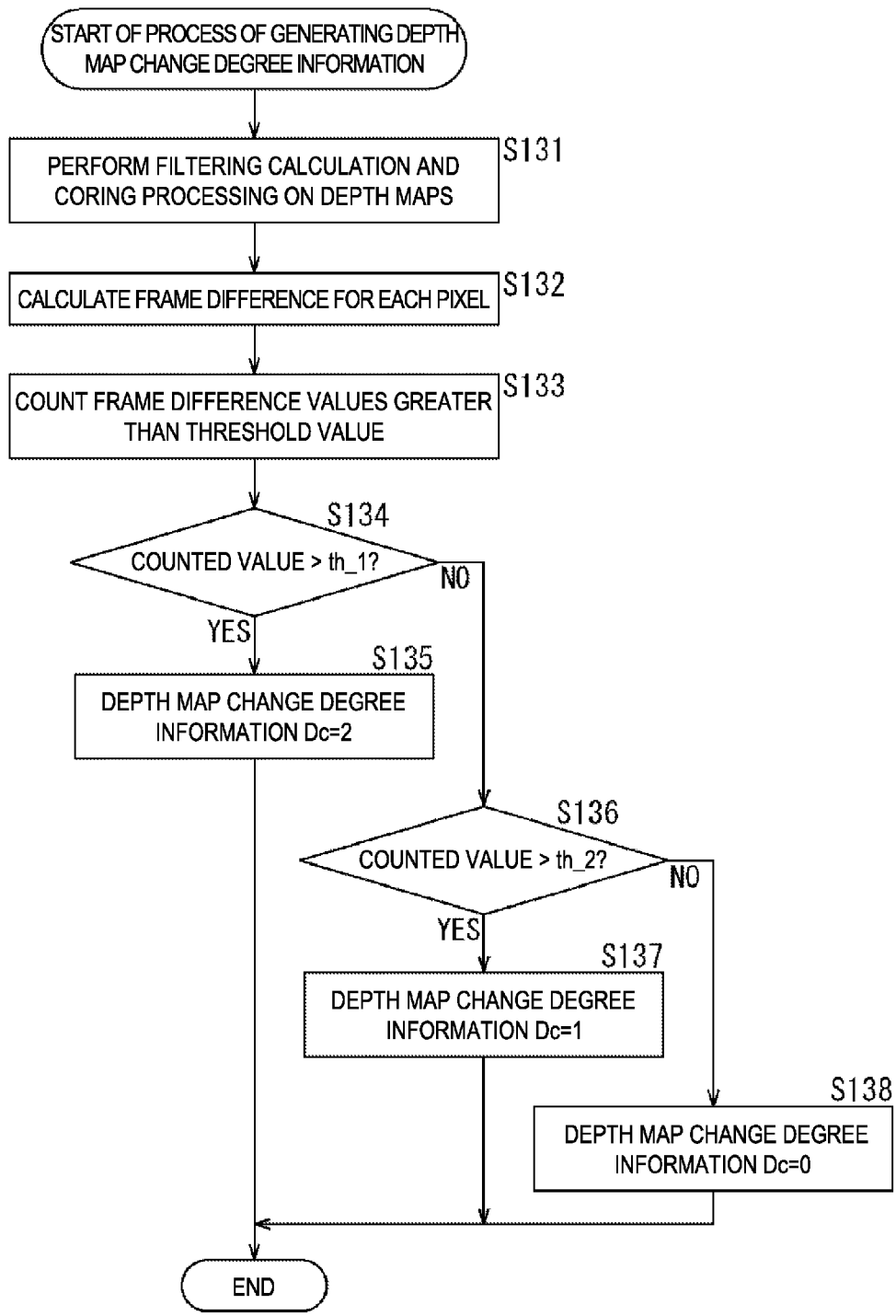
FIG. 11 is a flowchart illustrating a process of generating depth map change degree information.

Next, the process of generating the depth map change degree information by the additional information generating unit 121 will be described with reference to the flowchart of FIG. 11. The process of generating depth map change degree information in FIG. 11 is performed on the depth maps of the interest frame and the preceding frame acquired by the depth map generating unit 31.

In step S131, the filtering calculation and coring processing unit 141 performs the predetermined filtering calculation or the coring processing on the depth values of the depth maps of the interest frame and the preceding frame, and then supplies the result to the difference calculation unit 142.

In step S132, the difference calculation unit 142 calculates the differences (frame differences) between the depth values of the pixels of the depth maps of the interest frame and the preceding frame from the filtering calculation and coring processing unit 141, and then supplies the frame differences to the count processing unit 143.

In step S133, the count processing unit 143 counts the number of frame difference values larger than the predetermined threshold value among the frame difference values of the pixels from the difference calculation unit 142, and then the counted number to the depth map change degree information generating unit 144.

In step S134, the depth map change degree information generating unit 144 determines whether the counted value from the count processing unit 143 is greater than a first threshold value th_1.

When the depth map change degree information generating unit 144 determines that the counted value from the count processing unit 143 is greater than the first threshold value th_1 in step S134, the process proceeds to step S135 and the depth map change degree information generating unit 144 sets the depth map change degree information "Dc 2."

On the other hand, when the depth map change degree information generating unit 144 determines that the counted value from the count processing unit 143 is not greater than the first threshold value th_1 in step S134, the process proceeds to step S136. Then, the depth map change degree information generating unit 144 determines whether the counted value from the count processing unit 143 is greater than a second threshold value th_2, which is smaller than the first threshold value th_1.

When the depth map change degree information generating unit 144 determines that the counted value from the count processing unit 143 is greater than the second threshold value th_2 in step S136, the process proceeds to step S137 and the depth map change degree information generating unit 144 sets the depth map change degree information "Dc=1."

On the other hand, when the depth map change degree information generating unit 144 determines that the counted value from the count processing unit 143 is not greater than the second threshold value th_2 in step S136, the process proceeds to step S138 and the depth map change degree information generating unit 144 sets the depth map change degree information "Dc=0."

When the above-described processes are performed on each frame of the content recorded on the recording medium 34 as the interest frame, the depth map change degree information of each frame of the content recorded on the recording medium 34 is written as part of the additional information on the recording medium 34 by the reading and writing unit 33.

Specific Example of Depth Map Optimization Process

Figure 12:
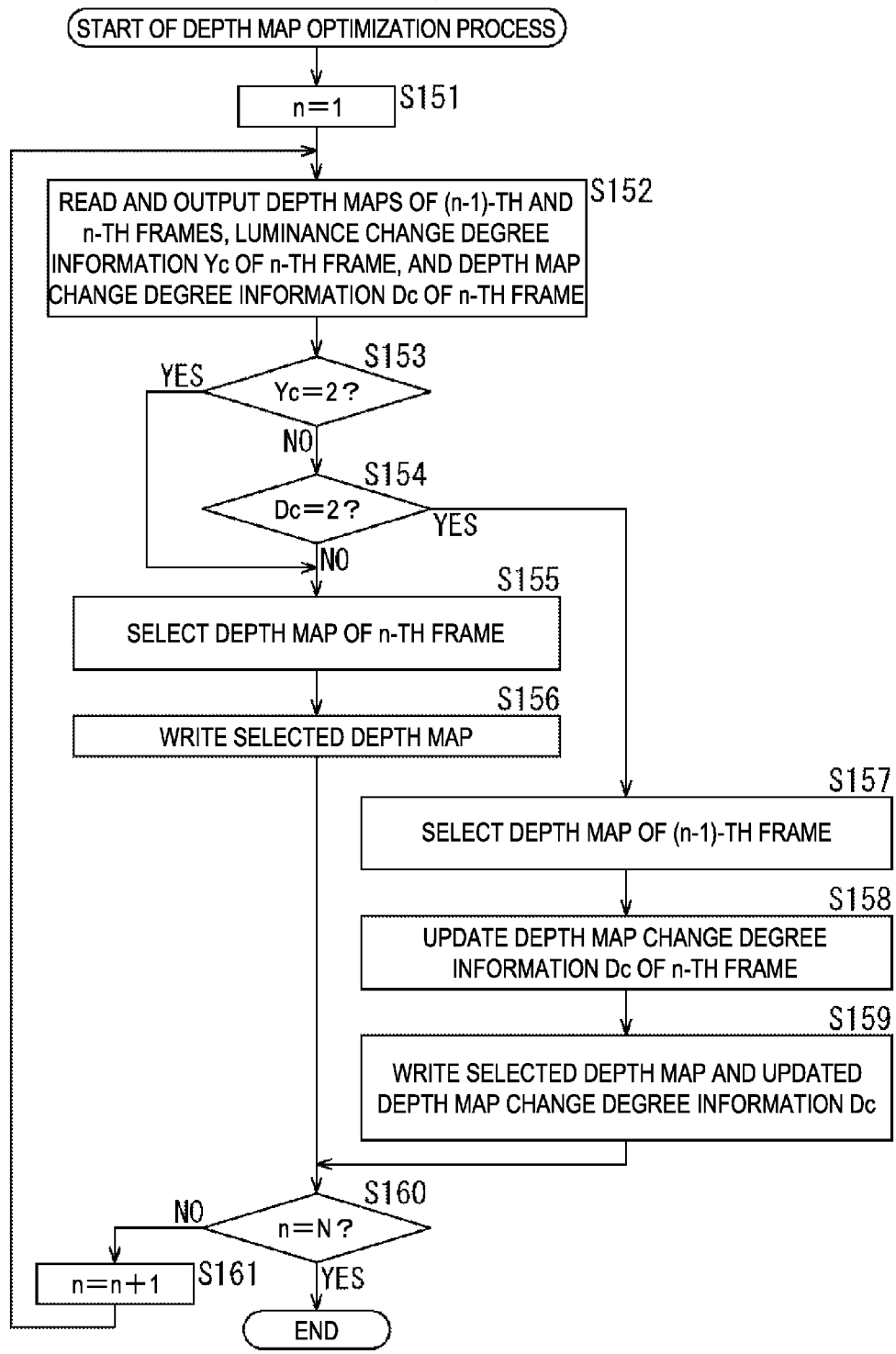
FIG. 12 is a flowchart illustrating a specific example of the depth map optimization process.

Next, referring to the flowchart of FIG. 12, a specific example of the depth map optimization process of the imaging processing apparatus 11 will be described when the luminance change degree information obtained through the above-described process of generating the luminance change degree information and the depth map change degree information obtained through the process of generating the depth map change degree information are set as the additional information. Hereinafter, an interest frame among the 0-th frame to the N-th frame of content is referred to as an n-th frame.

In step S151, the image processing apparatus 11 sets "n=1" so that the first frame becomes the interest frame.

In step S152, the reading and writing unit 33 reads the depth maps of the (n−1)-th and n-th frames, the luminance change degree information Yc of the n-th frame, and the depth map change degree information Dc of the n-th frame from the recording medium 34, and then supplies them to the depth map optimization unit 35.

In step S153, the depth map correcting unit 51 determines whether the luminance change degree change Yc is equal to 2. When the depth map correcting unit 51 determines that the luminance change degree change Yc is not equal to 2, the process proceeds to step S154.

In step S154, the depth map correcting unit 51 determines whether the depth map change degree information Dc is equal to 2. When the depth map correcting unit 51 determines that the depth map change degree information Dc is not equal to 2, the process proceeds to step S155.

In step S155, the depth map correcting unit 51 selects the depth map of the n-th frame between the depth map of the (n−1)-th frame and the depth map of the n-th frame and supplies the depth map of the n-th frame to the reading and writing unit 33.

In step S156, the reading and writing unit 33 performs overwriting with the depth map of the n-th frame from the depth map correcting unit 51 as the depth map of the interest frame on the recording medium 34, and then the process proceeds to step S160.

That is, when a change in the luminance value between the interest frame and the preceding frame is small and the degree of change in the depth map is small, the depth map of the interest frame is considered not to be erroneous, and thus the interest frame is not corrected.

On the other hand, when the depth map correcting unit 51 determines that the depth map change degree information Dc is equal to 2 in step S154, the process proceeds to step S157.

In step S157, the depth map correcting unit 51 selects the depth map of the (n−1)-th frame between the depth map of the (n−1)-th frame and the depth map of the n-th frame and supplies the depth map of the (n−1)-th frame to the reading and writing unit 33.

In step S158, the additional information updating unit 52 updates the depth map change degree information "Dc=2" of the n-th frame to the depth map change degree information "Dc=0" and supplies the depth map change degree information "Dc=0" to the reading and writing unit 33.

In step S159, the reading and writing unit 33 performs overwriting with the depth map of the (n−1)-th frame selected by the depth map correcting unit 51 and the depth map change degree information Dc updated by the additional information updating unit 52 as the depth map and the depth map change degree information of the interest frame, respectively, on the recording medium 34, and then the process proceeds to step S160.

That is, when the change in the luminance value between the interest frame and the preceding frame is small, but the degree of change in the depth map is large, the depth map of the interest frame is considered to be erroneous, and thus the depth map of the interest frame is replaced with the depth map of the preceding frame. Further, the depth map change degree information is updated so that the degree of change in the depth map is small.

Further, when the depth map correcting unit 51 determines that the luminance change degree change Yc is equal to 2 in step S153, step S154 is skipped and the process proceeds to step S155.

That is, when the degree of change in the luminance value between the interest frame and the preceding frame is large, the depth map of the interest frame is considered not to be erroneous, irrespective of the degree of change in the depth map, and thus the interest frame is not corrected.

In step S160, the image processing apparatus 11 determines whether n=N, that is, whether the interest frame is the final frame. When the image processing apparatus 11 determines that n≠N, the image processing apparatus 11 sets "n=n+1" in step S161 and the process returns to step S152. That is, the subsequent frame of the interest frame is set as the interest frame and the processes of step S152 to step S160 are repeated.

On the other hand, when image processing apparatus 11 determines that n=N in step S160, the depth map optimization process ends.

In the above-described process, when the change in the luminance value between the interest frame and the preceding frame is small, but the degree of change in the depth map is large, the depth map of the interest frame is considered to be erroneous, and thus the depth map of the interest frame is replaced with the depth map of the preceding frame. Accordingly, the erroneous depth map is not used and a suitable depth map can be used. Further, since the content and the depth maps are recorded on the recording medium, the change in the frame and the change in the depth map are known across the entire content. Since it is not necessary to perform time smoothing, a stable depth map can be obtained without temporal deviation.

In the above-described process, the depth map of the interest frame considered to be erroneous is replaced with the depth map of the preceding frame. However, since the depth maps of all the frames are recorded on the recording medium, the depth map of the interest frame may be replaced with the depth map of a temporally subsequent frame.

The foregoing description pertains to a case in which the depth map of the interest frame is considered to be erroneous, and the depth map of the interest frame is replaced with the depth map of a frame adjacent (previous or subsequent) to the interest frame. However, when a scene is changed between the interest frame and the adjacent frame (scene change), the change in the depth map of the corresponding frame is small or large.

Figure 13:
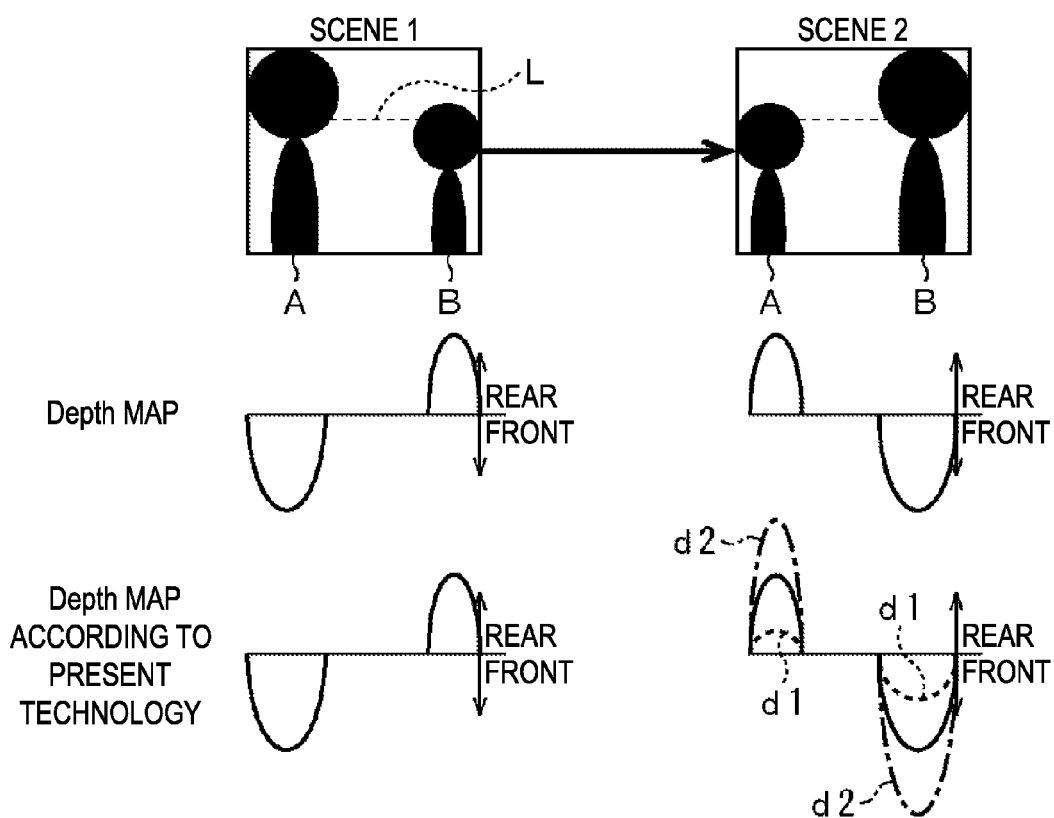
FIG. 13 is a diagram illustrating another example of the depth map according to an embodiment of the present technology.

For example, when a scene is changed from the frame of scene 1, where person A is in the front and person B is in the rear, to the frame of scene 2, where person A is in the rear and person B is in the front, as shown in the upper part of FIG. 13, the depth maps of the frames are changed, as shown in the intermediate port of FIG. 13.

Accordingly, in the embodiment of the present technology, as shown in the lower part of FIG. 13, the change in the depth map before and after the scene change can be made to be small or large by changing the depth map of the frame scene 2 after the scene change to a depth map d1 indicated by a dashed line or a depth map d2 indicated by a one-dot chain line.

4. Second Specific Example of Depth Map Optimization Process

Hereinafter, a specific configuration and a specific process will be described in which the change in the depth before and after the scene change is made to be small or large, as described above. In the specific example, information indicating a change in a composition between the frames and information indicating a change in the depth map between the frames are generated as the additional information.

Example of Specific Configuration of Additional Information Generating Unit

First, an example of the specific configuration of an additional information generating unit will be described with reference to FIG. 14.

Figure 14:
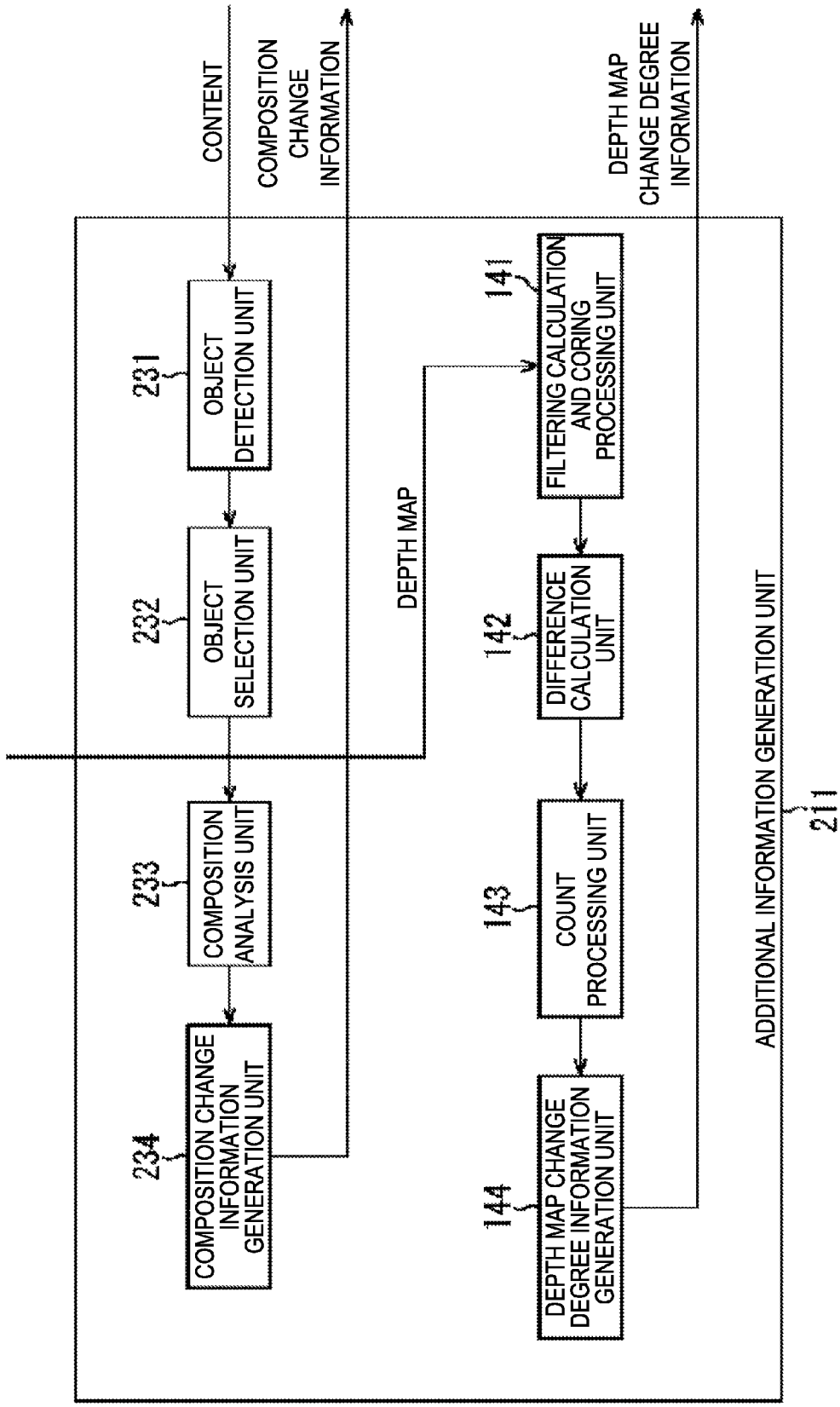
FIG. 14 is a block diagram illustrating another specific example of the additional information generating unit.

In an additional information generating unit 211 in FIG. 14, the same names and the same reference numerals as in the functional configuration of the additional information generating unit 121 in FIG. 9 are given, and the description thereof will appropriately not be repeated.

That is, the additional information generating unit 211 in FIG. 14 is different from the additional information generating unit 121 in FIG. 9 in that an object detection unit 231, an object selection unit 232, a composition analysis unit 233, and a composition change information generating unit 234 are provided instead of the filter calculation and coring processing unit 131, the difference calculation unit 132, the count processing unit 133, and the luminance change degree information generating unit 134.

The object detection unit 231 detects an object as a subject in a frame of content read from the recording medium 34 by the reading and writing unit 33, and supplies information regarding the position or size of the object in this frame to the object selection unit 232.

The object selection unit 232 selects an interest object in the frame based on the information regarding the position or size of the object from the object detection unit 231, and then supplies information regarding the interest object to the composition analysis unit 233.

The composition analysis unit 233 analyzes the composition of the frame based on the information from the object selection unit 232, and then supplies composition information indicating the analysis result to the composition change information generating unit 234.

The composition change information generating unit 234 generates composition change information by calculating a difference between two continuous frames with the composition information supplied in each frame from the composition analysis unit 233. The generated composition change information is written as part of the additional information on the recording medium 34 by the reading and writing unit 33.

Process of Generating Composition Change Information

Figure 15:
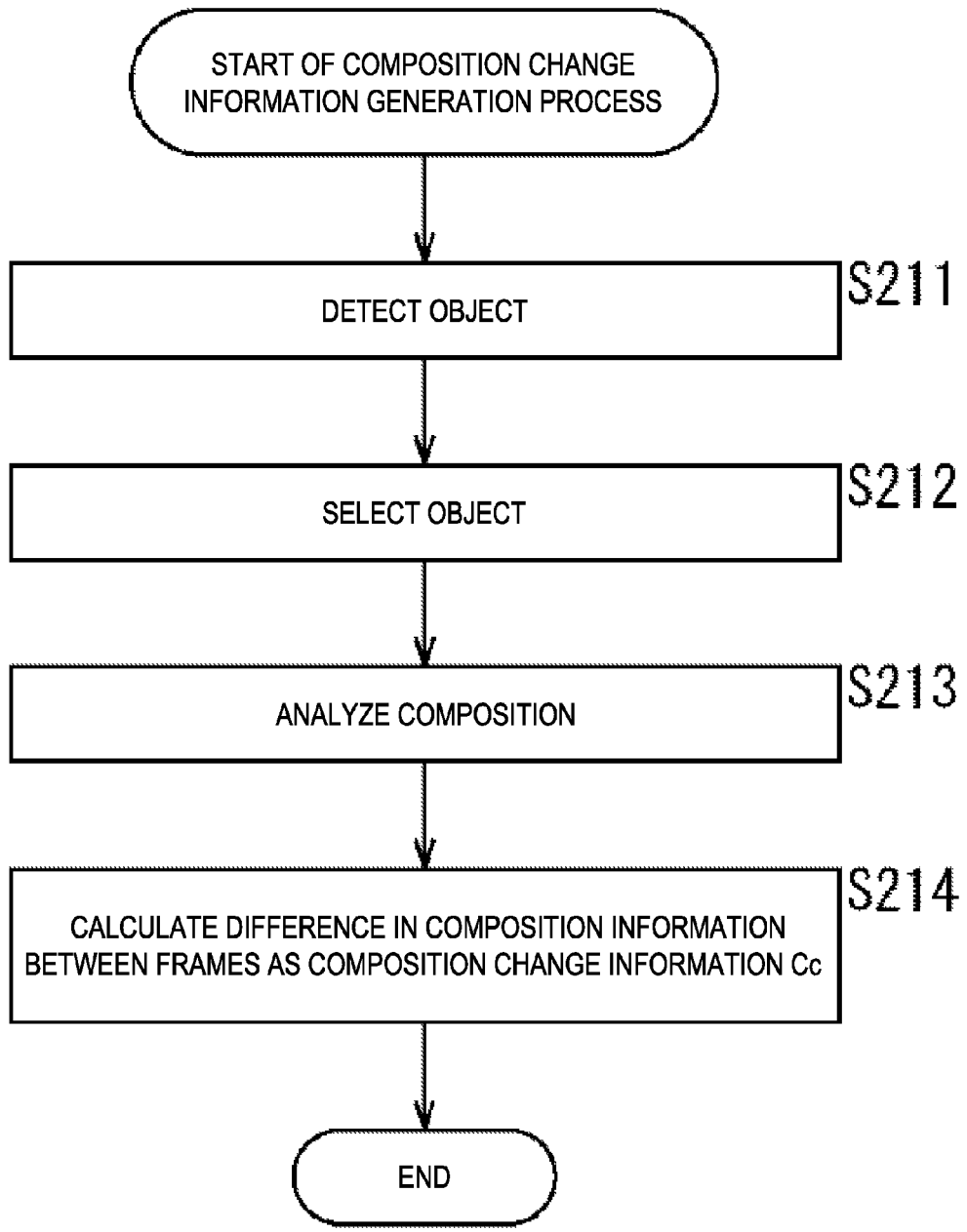
FIG. 15 is a flowchart illustrating a process of generating composition change information.

Next, a process of generating composition change information by the additional information generating unit 211 will be described with reference to the flowchart of FIG. 15. The composition change information generation process in FIG. 15 is performed on each frame of the content read from the recording medium 34.

In step S211, the object detection unit 231 detects an object in an interest frame of the content read from the recording medium 34 by the reading and writing unit 33, and then supplies the information regarding the position or size of the object in the interest frame to the object selection unit 232.

In step S212, the object selection unit 232 selects an interest object in the interest frame based on the information from the object detection unit 231, and then supplies information regarding the interest object to the composition analysis unit 233.

For example, when the composition detection unit 231 detects five objects A, B, O1, O2, and O3, as shown in the left part of FIG. 16, the object selection unit 232 selects object A with the largest occupation area in the frame and object B with the second largest occupation area, as shown in the right part of FIG. 16.

In step S213, the composition analysis unit 233 analyzes the composition of the frame based on the information from the object selection unit 232, and then supplies the composition information as the analysis result to the composition change information generating unit 234.

For example, the composition analysis unit 233 compares the composition of a frame to be analyzed with a plurality of composition patterns, which are prepared in advance and have indexes that are closer in value when the compositions are more similar, and then supplies the index of the composition pattern, which is the most similar to the composition of the frame of the analysis result, to the composition change information generating unit 234.

For example, the composition analysis unit 233 divides the frame of the analysis result into a plurality of regions and supplies, as the composition information, information indicating whether the interest object is present in each of the divided regions to the composition change information generating unit 234.

In step S214, the composition change information generating unit 234 generates, as composition change information Cc, a difference between the composition information of the interest frame and the composition information of the preceding frame from the composition analysis unit 233.

For example, when the composition information is the index of the composition pattern, the absolute value of the difference between the value of the index of the interest frame and the value of the index of the preceding frame is considered as the composition change information Cc.

For example, when the composition information is the information indicating whether the interest object is present in each of the regions divided from the frame, the number of regions where the presence or absence of the interest object agrees between the interest frame and the preceding frame is considered as the composition change information Cc.

That is, the larger the value of the composition change information Cc is, the larger the change in the composition between the interest frame and the preceding frame is.

When the above-described processes are performed on each frame of the content recorded on the recording medium 34 as the interest frame, the composition change information of each frame of the content recorded on the recording medium 34 is written as part of the additional information on the recording medium 34 by the reading and writing unit 33.

Process of Generating Depth Map Change Degree Information

Since the process of generating the depth map change degree information by the additional information generating unit 211 is the same as the process of generating the depth map change degree information by the additional information generating unit 121 described with reference to the flowchart of FIG. 11, the description thereof will not be repeated.

That is, when the process of generating the depth map change degree information by the additional information generating unit 211 is performed on each frame of content recorded on the recording medium 34 as the interest frame, the depth map change degree information of each frame of the content recorded on the recording medium 34 is written as part of the additional information on the recording medium 34 by the reading and writing unit 33.

Specific Example of Depth Map Optimization Process

Next, referring to the flowchart of FIG. 17, a specific example of the depth map optimization process performed by the imaging processing apparatus 11 will be described when the composition change information obtained through the above-described process of generating the composition change information and the depth map change degree information obtained through the process of generating the depth map change degree information are set as the additional information. Hereinafter, an interest frame among the 0-th frame to the N-th frame of content is referred to as an n-th frame.

In step S231, the image processing apparatus 11 sets "n=1" so that the first frame becomes the interest frame.

In step S232, the reading and writing unit 33 reads the depth maps of the (n−1)-th and n-th frames, the composition change information Cc of the n-th frame, and the depth map change degree information Dc of the n-th frame from the recording medium 34, and then supplies them to the depth map optimization unit 35.

In step S233, the depth map correcting unit 51 determines whether the composition change information Cc is greater than a predetermined threshold value Cth. When the depth map correcting unit 51 determines that the composition change information Cc is not greater than the predetermined threshold value Cth, the process proceeds to step S234.

In step S234, the depth map correcting unit 51 determines whether the depth map change degree information Dc is equal to 2. When the depth map correcting unit 51 determines that the depth map change degree information Dc is not equal to 2, the process proceeds to step S235.

In step S235, the depth map correcting unit 51 selects the depth map of the n-th frame between the depth map of the (n−1)-th frame and the depth map of the n-th frame and supplies the depth map of the n-th frame to the reading and writing unit 33.

In step S236, the reading and writing unit 33 performs overwriting with the depth map of the n-th frame from the depth map correcting unit 51 as the depth map of the interest frame on the recording medium 34, and then the process proceeds to step S243.

That is, when a change in the composition between the interest frame and the preceding frame is small and the degree of change in the depth map is small, the depth map of the interest frame is not corrected.

On the other hand, when the depth map correcting unit 51 determines that the depth map change degree information Dc is equal to 2 in step S234, the process proceeds to step S237.

In step S237, the depth map correcting unit 51 calculates a weighted average of the depth maps of the (n−1)-th and n-th frames and sets the weighted average to the depth map of the n-th frame.

Specifically, the depth map correcting unit 51 performs calculation of Equation (1) below in each pixel using a depth value Pic_d(n−1) of the depth map of the (n−1)-th frame and a depth value Pic_d(n) of the depth map of the n-th frame.

$$\text{Pic\_d}(n) \times \alpha + \text{Pic\_d}(n-1) \times (1-\alpha) \qquad (1)$$

In this equation, $\alpha$ is a value that is set in the range of "$0 \leq \alpha \leq 1$" and is set to a value close to 0 here.

Thus, the weighted average of the depth values given in Equation (1) is in the range from the depth value Pic_d(n−1) to the depth value Pic_d(n) and is a value closer to the depth value Pic_d(n−1).

The obtained depth map of the n-th frame is supplied to the reading and writing unit 33.

In step S238, the additional information updating unit 52 updates the depth map change degree information Dc of the n-th frame based on the depth map of the (n−1)-th frame and the newly calculated depth map of the n-th frame. Specifically, the additional information updating unit 52 supplies the reading and writing unit 33 with the depth map change degree information obtained as the depth map change degree information Dc of the n-th frame by performing the same process as the process of generating the depth map change degree information, as described with reference to the flowchart of FIG. 11, on the depth map of the (n−1)-th frame and the newly calculated depth map of the n-th frame.

In step S239, the reading and writing unit 33 performs overwriting with the depth map of the n-th frame calculated by the depth map correcting unit 51 and the depth map change degree information Dc updated by the additional information updating unit 52 as the depth map and the depth map change degree information of the interest frame, respectively, on the recording medium 34, and then the process proceeds to step S243.

That is, when the change in the composition between the interest frame and the preceding frame is small and the degree of change in the depth map is large, the depth map of the interest frame is corrected to the depth map which is in the range from the depth map of the preceding frame and the depth map of the interest frame and is closer to the depth map of the preceding frame. Further, the depth map change degree information is updated in accordance with the corrected depth map of the interest frame.

When the depth map correcting unit 51 determines that the composition change information Cc is greater than the predetermined threshold value Cth in step S233, the process proceeds to step S240.

In step S240, the depth map correcting unit 51 calculates a weighted average of the depth maps of the (n−1)-th and n-th frames and sets the weighted average to the depth map of the n-th frame.

Specifically, the depth map correcting unit 51 performs calculation of Equation (1) described above in each pixel using a depth value Pic_d(n−1) of the depth map of the (n−1)-th frame and a depth value Pic_d(n) of the depth map of the n-th frame. In the equation, $\alpha$ is a value that is set to a value close to 1 here.

Thus, the weighted average of the depth values given in Equation (1) is in the range from the depth value Pic_d(n−1) to the depth value Pic_d(n) and is a value closer to the depth value Pic_d(n).

The obtained depth map of the n-th frame is supplied to the reading and writing unit 33.

In step S241, the additional information updating unit 52 updates the depth map change degree information Dc of the n-th frame based on the depth map of the (n−1)-th frame and the newly calculated depth map of the n-th frame. Specifically, the additional information updating unit 52 supplies the reading and writing unit 33 with the depth map change degree information as the depth map change degree information Dc of the n-th frame obtained by performing the same process as the process of generating the depth map change degree information described with reference to the flowchart of FIG. 11, on the depth map of the (n−1)-th frame and the newly calculated depth map of the n-th frame.

In step S242, the reading and writing unit 33 performs overwriting with the depth map of the n-th frame calculated by the depth map correcting unit 51 and the depth map change degree information Dc updated by the additional information updating unit 52 as the depth map and the depth map change degree information of the interest frame, respectively, on the recording medium 34, and then the process proceeds to step S243.

That is, when the change in the composition between the interest frame and the preceding frame is large, the depth map of the interest frame is corrected to the depth map which is in the range from the depth map of the preceding frame and the depth map of the interest frame and is closer to the depth map of the interest frame. Further, the depth map change degree information is updated in accordance with the corrected depth map of the interest frame.

In step S243, the image processing apparatus 11 determines whether n=N, that is, whether the interest frame is the final frame. When the image processing apparatus 11 determines that n≠N, the image processing apparatus 11 sets "n=n+1" in step S244 and the process returns to step S232. That is, the subsequent frame of the interest frame is set as the interest frame and the processes of step S232 to step S243 are repeated.

On the other hand, when image processing apparatus 11 determines that n=N in step S243, the depth map optimization process ends.

In the above-described process, when the change in the composition value between the interest frame and the preceding frame is small and the degree of change in the depth map is large, the depth map of the interest frame is corrected to the depth map which is in the range of the depth map of the preceding frame and the depth map of the interest frame and is closer to the depth map of the preceding frame. Further, when the change in the composition value between the interest frame and the preceding frame is large, the depth map of the interest frame is corrected to the depth map which is in the range of the depth map of the preceding frame and the depth map of the interest frame and is closer to the depth map of the interest frame. Accordingly, when the scene is changed between the interest frame the preceding frame, the change in the depth map of the corresponding frame is small, and thus it is possible to reduce the burden on the eyes of a user who views a stereoscopic image generated based on the depth map.

The foregoing description pertains to a case in which the change in the depth map of the corresponding frame is small when the scene is changed between the interest frame and the preceding frame. However, the change in the depth map of the corresponding frame may be made to be large.

Figure 17:
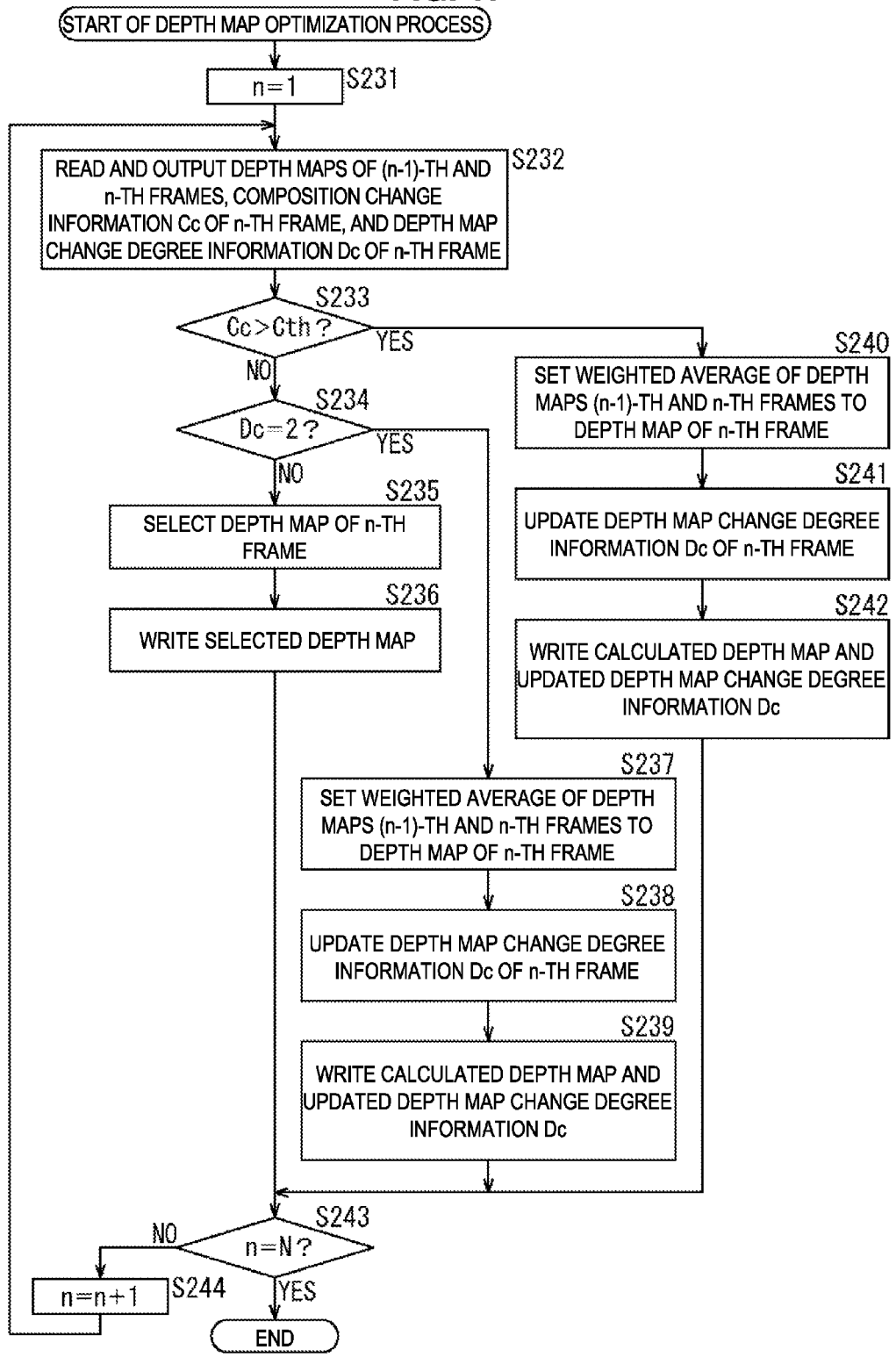
FIG. 17 is a flowchart illustrating another specific example of the depth map optimization process.

Specifically, when it is determined in step S233 of the flowchart of FIG. 17 that the composition change information Cc is greater than the predetermined threshold value Cth or it is determined in step S234 that the depth map change degree information Dc is not equal to 2 (the change in the depth map is not large), the depth value of the depth map may be corrected to be large. Then, when the scene is changed between the interest frame and the preceding frame, the change in the depth map of the corresponding frame is large.

In this case, when it is determined in step S234 that the depth map change degree information Dc is equal to 2 (the change in the depth map is large), the depth map of the interest frame is not corrected.

The foregoing description pertains to a case in which the change in the depth map between the preceding frame and the interest frame is small or large. However, since the depth maps of all the frames are recorded on the recording medium, the change in the depth map between the interest frame and a temporally subsequent frame may be small or large.

Further, the foregoing description pertains to a case in which the recording medium 34 is installed in the image processing apparatus 11. However, the recording medium may be mounted on the outside of the image processing apparatus.

5. Another Configuration of Image Processing Apparatus According to Embodiment of the Present Technology FIG. 18 is a diagram illustrating the configuration of an image processing apparatus according to another embodiment of the present technology.

Figure 18:
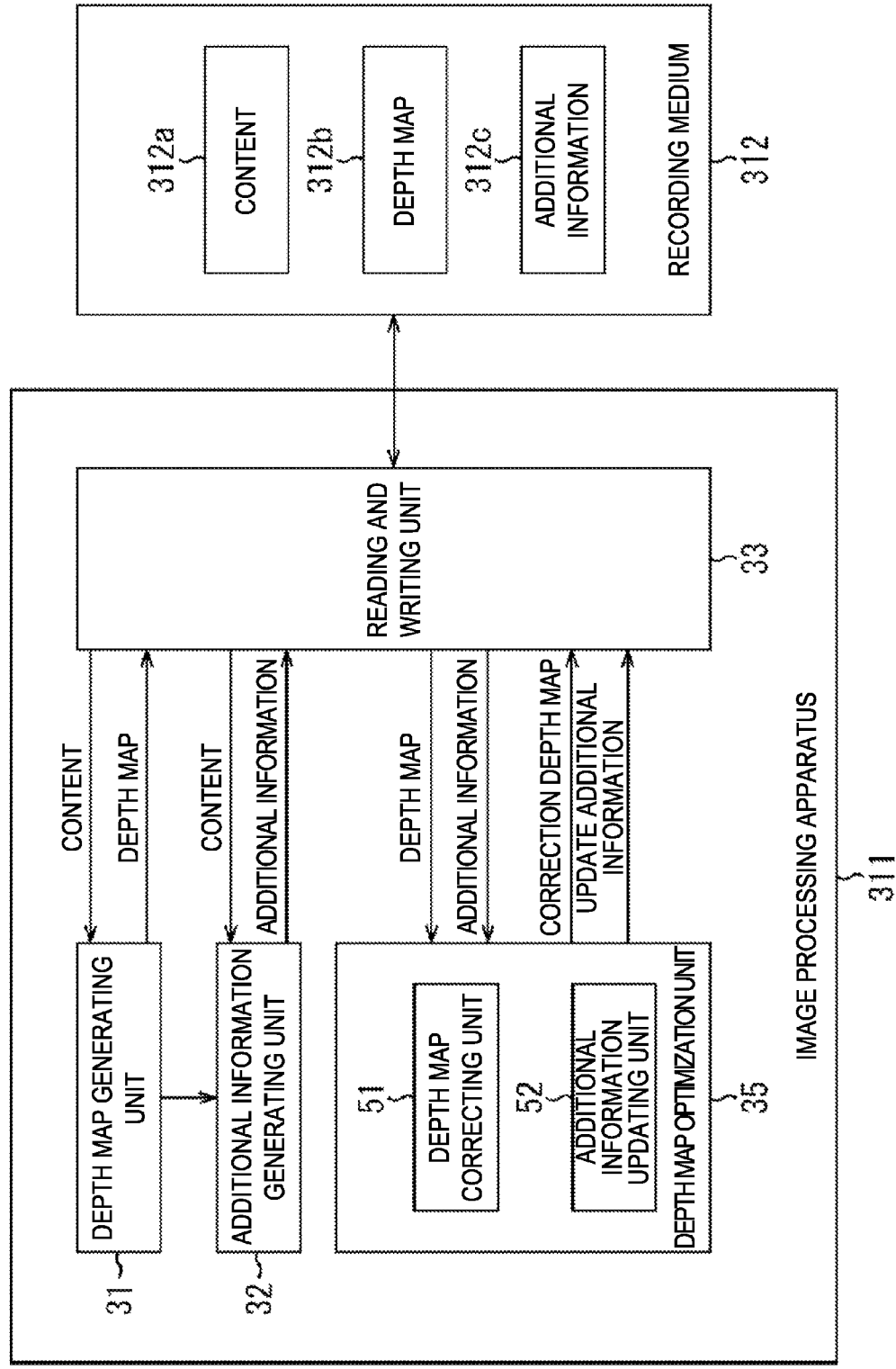
FIG. 18 is a block diagram illustrating an example of a functional configuration of an image processing apparatus according to another embodiment of the present technology.

A recording medium 312 is mounted on the outside of an image processing apparatus 311 in FIG. 18.

In the image processing apparatus 311 in FIG. 18, the same names and the same reference numerals as those of the functional configuration of the additional information generating unit 11 in FIG. 1 are given, and the description thereof will appropriately not be repeated.

That is, the image processing apparatus 311 in FIG. 18 is different from the image processing apparatus 11 in FIG. 1 in that the recording medium 34 is excluded.

The recording medium 312 is configured by, for example, a universal serial bus (USB) memory, a digital versatile disc (DVD), or a Blu-ray disc (BD (registered trademark)). The recording medium 312 records content 312a, a depth map 312b, and additional information 312c. The content 312a is recorded in advance and is read appropriately from the recording medium 312 by the reading and writing unit 33. Further, the depth map 34b and the additional information 312c are appropriately written on the recording medium 312 or are appropriately read from the recording medium 312 by the reading and writing unit 33.

In the image processing apparatus 311 in FIG. 18, it is possible to obtain the same advantages as in the image processing apparatus 11 in FIG. 1. Further, since a depth map generation process and a depth map optimization process of the image processing apparatus 311 in FIG. 18 are basically the same as the processes of the image processing apparatus 11 in FIG. 1 described with reference to the flowcharts of FIGS. 4 and 5, the description thereof will not be repeated.

The above-described series of processes may be performed by hardware or software. When the series of processes are performed by software, a program for the software is installed on, for example, a computer in which dedicated hardware is embedded or a general personal computer capable of executing various functions by installing various programs from a program recording medium.

Figure 19:
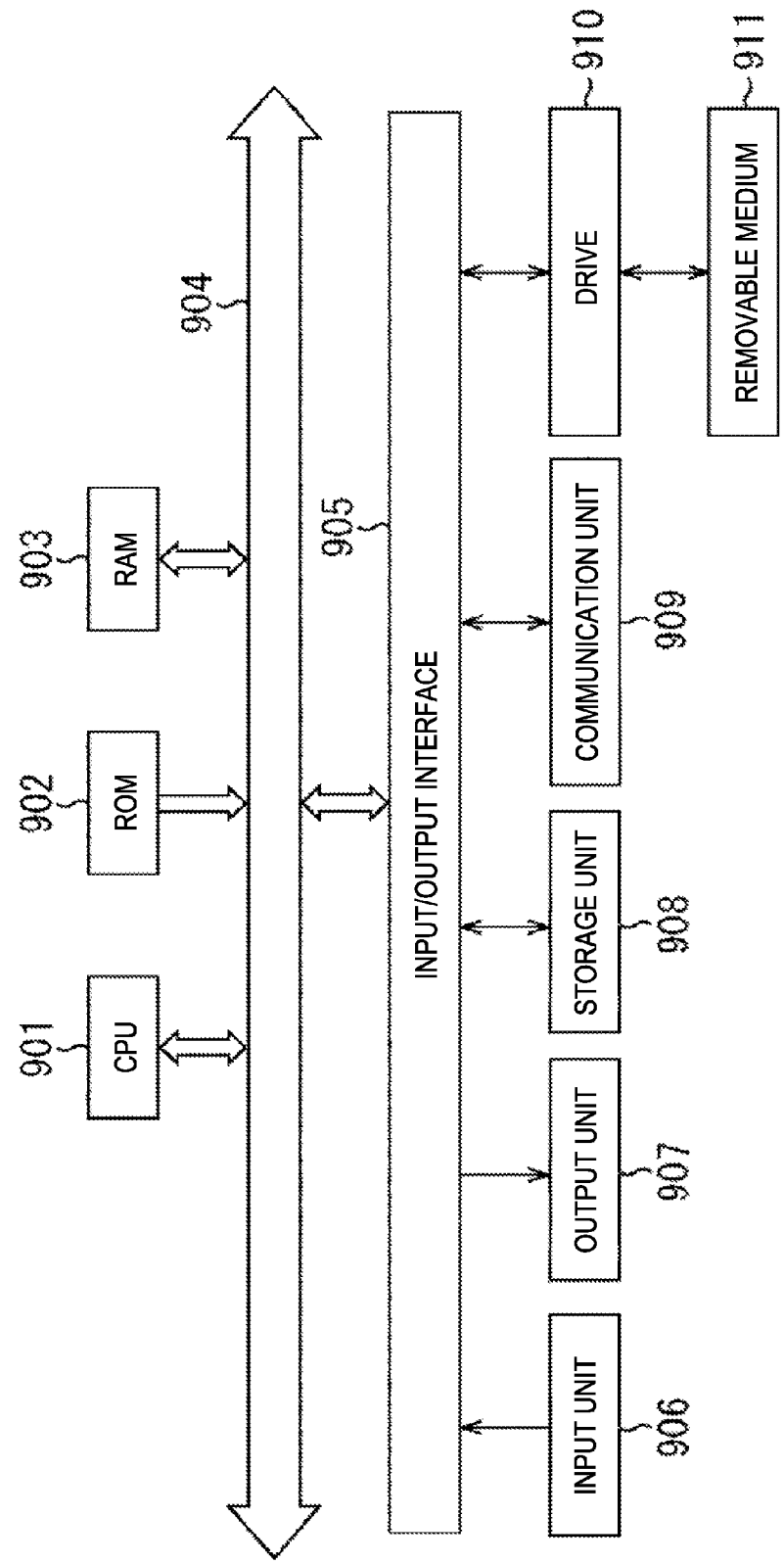
FIG. 19 is a block diagram illustrating an example of a hardware configuration of a computer.

FIG. 19 is a block diagram illustrating an example of a hardware configuration of a computer executing the above-described series of processes by a program.

In the computer, a central processing unit (CPU) 901, a read-only memory (ROM) 902, and a random access memory (RAM) 903 are connected to each other via a bus 904.

An input/output interface 905 is connected to the bus 904. An input unit 906 configured by a keyboard, a mouse, a microphone, or the like, an output unit 907 configured by a display, a speaker, or the like, a storage unit 908 configured by a hard disk, a non-volatile memory, or the like, a communication unit 909 configured by a network interface or the like, and a drive 910 driving a removable medium 911 such as a magnetic disk, an optical disc, a magneto-optical disk, or a semiconductor memory are connected to the input/output interface 905.

In the computer with the above-described configuration, the CPU 901 executes the above-described series of processes, for example, by loading and executing the program stored in the storage unit 908 on the RAM 903 via the input/output interface 905 and the bus 904.

For example, the program executed by the computer (the CPU 901) is recorded in the removable medium 911 as a package medium, such as a magnetic disk (including a flexible disk), an optical disc (including a compact disc-read only memory (CD-ROM) and a digital versatile disc (DVD)), a magneto-optical disc, or a semiconductor memory, for supply. Further, the program can be supplied via a wired or wireless transmission medium such as a local area network, the Internet, or digital satellite broadcast.

The program can be installed on the storage unit 908 via the input/output interface 905 by mounting the removable medium 911 on the drive 910. Further, the program can be received by the communication unit 909 via a wired or wireless transmission medium and can be installed on the storage unit 908. Further, the program can be installed in advance on the ROM 902 or the storage unit 908.

The program executed by the computer may be a program processed chronologically in the order described in the specification or a program processed in parallel or at a necessary timing when called.

Embodiments of the present technology are not limited to the above-described embodiments, but may be modified in various ways without departing from the spirit and essence of the present technology.

The present technology may be configured as follows.

(1) An image processing apparatus including:

a reading and writing unit that writes and reads depth information indicating a depth of a subject in frames of a moving image, and change information indicating a change between continuous frames, on and from a recording medium; and a depth information correcting unit that corrects the depth information read by the reading and writing unit based on the change information read by the reading and writing unit, wherein the reading and writing unit performs overwriting with the depth information corrected by the depth information correcting unit on the recording medium.

(2) The image processing apparatus according to (1), further including:

a depth information generating unit that generates the depth information based on the moving image recorded on the recording medium; and a change information generating unit that generates the change information based on the moving image recorded on the recording medium, wherein the reading and writing unit writes the depth information generated by the depth information generating unit and the change information generated by the change information generating unit on the recording medium.

(3) The image processing apparatus according to (2), wherein the change information generating unit generates the change information regarding a change between an interest frame and an adjacent frame adjacent to the interest frame, and wherein the depth information correcting unit corrects the depth information of the interest frame based on the change information read by the reading and writing unit.

(4) The image processing apparatus according to (3), wherein the change information generating unit generates pixel value change information indicating a change in a pixel value of a pixel between the interest frame and the adjacent frame, and depth information change information indicating a change in the depth information between the interest frame and the adjacent frame, and wherein when the change in the pixel value expressed by the pixel value change information is small and the change in the depth information expressed by the depth information change information is large, the depth information correcting unit replaces the depth information of the interest frame with the depth information of the adjacent frame.

(5) The image processing apparatus according to (3),
wherein the change information generating unit generates composition change information indicating a change in a composition between the interest frame and the adjacent frame, and depth information change information indicating a change in the depth information between the interest frame and the adjacent frame, and
wherein the depth information correcting unit sets a weighted average of the depth information of the interest frame and the depth information of the adjacent frame to the depth information of the interest frame, in accordance with the change in the composition expressed by the composition change information and the change in the depth information expressed by the depth information change information.

(6) The image processing apparatus according to (3),
wherein the change information generating unit generates scene change information indicating a change in a scene between the interest frame and the adjacent frame, and
wherein the depth information correcting unit corrects the depth information of the interest frame in accordance with the change in the scene expressed by the scene change information.

(7) The image processing apparatus according to (3),
wherein the change information generating unit generates a motion vector as the change information based on the interest frame and the adjacent frame, and
wherein the depth information correcting unit performs motion compensation on the depth information of the interest frame based on the motion vector.

(8) The image processing apparatus according to any one of (1) to (7), further including:
the recording medium.

(9) The image processing apparatus according to any one of (1) to (7), wherein the recording medium is mounted on the outside of the image processing apparatus.

(10) The image processing apparatus according to any one of (1) to (8), further including:
a change information updating unit that updates the change information corresponding to the depth information corrected by the depth information correcting unit,
wherein the reading and writing unit performs overwriting with the change information updated by the change information updating unit on the recording medium.

(11) An image processing method of an image processing apparatus including a reading and writing unit that writes and reads depth information indicating a depth of a subject in frames of a moving image, and change information indicating a change between continuous frames, on and from a recording medium, and a depth information correcting unit that corrects the depth information read by the reading and writing unit based on the change information read by the reading and writing unit, the image processing method including: by the image processing apparatus,
reading the depth information indicating the depth of the subject in the frames of the moving image and the change information indicating the change between the continuous frames from a recording medium;
correcting the read depth information based on the read change information; and
performing overwriting with the corrected depth information on the recording medium.

(12) A program for causing a computer to execute a process including:
reading depth information indicating a depth of a subject in frames of a moving image, and change information indicating a change between the continuous frames, from a recording medium;
correcting the depth information read by the process of the reading step based on the change information read by the process of the reading step and
performing overwriting with the depth information corrected by the process of the correcting step on the recording medium.

The present technology contains subject matter related to that disclosed in Japanese Priority Patent Application JP 2011-126027 filed in the Japan Patent Office on Jun. 6, 2011, the entire content of which is hereby incorporated by reference.

What is claimed is:

1. An image processing apparatus comprising:
a reading and writing unit that writes and reads on and from a recording medium depth information indicating a depth of a subject in frames of a moving image and change information indicating a change between continuous frames in a series of frames; and
a depth information correcting unit that corrects errors in the depth information due to noise to time smooth the depth information, wherein the depth information correcting unit corrects the errors in the depth information based on the change information read by the reading and writing unit,
wherein the reading and writing unit performs overwriting with the depth information corrected by the depth information correcting unit on the recording medium.

2. The image processing apparatus according to claim 1, further comprising:
a depth information generating unit that generates the depth information based on the moving image recorded on the recording medium; and
a change information generating unit that generates the change information based on the moving image recorded on the recording medium,
wherein the reading and writing unit writes the depth information generated by the depth information generating unit and the change information generated by the change information generating unit on the recording medium.

3. The image processing apparatus according to claim 2,
wherein the change information generating unit generates the change information regarding a change between an interest frame and an adjacent frame adjacent to the interest frame, and
wherein the depth information correcting unit corrects the depth information of the interest frame based on the change information read by the reading and writing unit.

4. The image processing apparatus according to claim 3,
wherein the change information generating unit generates pixel value change information indicating a change in a pixel value of a pixel between the interest frame and the adjacent frame, and depth information change information indicating a change in the depth information between the interest frame and the adjacent frame, and
wherein when the change in the pixel value expressed by the pixel value change information is small and the change in the depth information expressed by the depth information change information is large, the depth information correcting unit replaces the depth information of the interest frame with the depth information of the adjacent frame.

5. The image processing apparatus according to claim 3, wherein the change information generating unit generates composition change information indicating a change in a composition between the interest frame and the adjacent frame, and depth information change information indicating a change in the depth information between the interest frame and the adjacent frame, and wherein the depth information correcting unit sets a weighted average of the depth information of the interest frame and the depth information of the adjacent frame to the depth information of the interest frame, in accordance with the change in the composition expressed by the composition change information and the change in the depth information expressed by the depth information change information.

6. The image processing apparatus according to claim 3, wherein the change information generating unit generates scene change information indicating a change in a scene between the interest frame and the adjacent frame, and wherein the depth information correcting unit corrects the depth information of the interest frame in accordance with the change in the scene expressed by the scene change information.

7. The image processing apparatus according to claim 3, wherein the change information generating unit generates a motion vector as the change information based on the interest frame and the adjacent frame, and wherein the depth information correcting unit performs motion compensation on the depth information of the interest frame based on the motion vector.

8. The image processing apparatus according to claim 1, further comprising:
the recording medium.

9. The image processing apparatus according to claim 1, wherein the recording medium is mounted on the outside of the image processing apparatus.

10. The image processing apparatus according to claim 1, further comprising:

a change information updating unit that updates the change information corresponding to the depth information corrected by the depth information correcting unit, wherein the reading and writing unit performs overwriting with the change information updated by the change information updating unit on the recording medium.

11. An image processing method of an image processing apparatus including a reading and writing unit that writes and reads depth information indicating a depth of a subject in frames of a moving image, and change information indicating a change between continuous frames in a series of frames, on and from a recording medium, and a depth information correcting unit that corrects the depth information read by the reading and writing unit based on the change information read by the reading and writing unit, the image processing method comprising: by the image processing apparatus, reading the depth information indicating the depth of the subject in the frames of the moving image and the change information indicating the change between the continuous frames from a recording medium;

correcting errors in the read depth information due to noise to time smooth the depth information, wherein correction of errors of the depth information is based on the read change information; and performing overwriting with the corrected depth information on the recording medium.

12. A non-transitory computer-readable medium having embodied thereon a program, which when executed by a computer, causes the computer to execute a process comprising:

reading depth information indicating a depth of a subject in frames of a moving image and change information indicating a change between the continuous frames, from a recording medium;

correcting errors in the read depth information due to noise to time smooth the depth information, wherein correction of errors of the depth information is based on the change information read by the process of the reading step; and performing overwriting with the depth information corrected by the process of the correcting step on the recording medium.

* * * * *